United States Patent
Komatsu et al.

(10) Patent No.: US 9,978,527 B2
(45) Date of Patent: May 22, 2018

(54) SOLID ELECTROLYTIC CAPACITOR AND MANUFACTURING METHOD THEREOF

(71) Applicant: RUBYCON CORPORATION, Nagano (JP)

(72) Inventors: Akihiko Komatsu, Nagano (JP); Akira Iijima, Nagano (JP); Masayuki Sakaguchi, Nagano (JP); Yosuke Nozawa, Nagano (JP); Yoshishige Sakurai, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 197 days.

(21) Appl. No.: 14/873,265

(22) Filed: Oct. 2, 2015

(65) Prior Publication Data

US 2016/0099113 A1   Apr. 7, 2016

(30) Foreign Application Priority Data

Oct. 3, 2014   (JP) ................. 2014-205300
Oct. 24, 2014  (JP) ................. 2014-217753
Jan. 13, 2015  (JP) ................. 2015-004587

(51) Int. Cl.
*H01G 9/025* (2006.01)
*H01G 9/00* (2006.01)
*H01G 9/15* (2006.01)
*H01G 9/022* (2006.01)

(52) U.S. Cl.
CPC .......... *H01G 9/0036* (2013.01); *H01G 9/022* (2013.01); *H01G 9/025* (2013.01); *H01G 9/151* (2013.01)

(58) Field of Classification Search
CPC ............... H01G 9/151; H01G 2009/0018
See application file for complete search history.

(56) References Cited

U.S. PATENT DOCUMENTS 9,589,738 B2 *  3/2017  Sugihara ............ H01G 9/028
2014/0334066 A1  11/2014  Sugihara et al.
2015/0255220 A1  9/2015  Komatsu et al.

FOREIGN PATENT DOCUMENTS

WO   2013/094462 A1   6/2013
WO   2014/050913 A1   4/2014

* cited by examiner

Primary Examiner — Eric Thomas
(74) Attorney, Agent, or Firm — Hauptman Ham, LLP

(57) ABSTRACT

A solid electrolytic capacitor includes: an anode foil on which an oxide film is formed; a cathode foil; and a separator between the anode and cathode foils, wherein a solid electrolyte in a fine particle form made of a conductive high molecular weight compound and a water-soluble high-molecular weight compound in a liquid form are introduced into a gap between the anode and cathode foils in a state where the water-soluble high-molecular weight compound in a liquid form surrounds the solid electrolyte, and a ratio of an area that the solid electrolyte occupies in the gap is set to a value which falls within a range of 1 vol % to 30 vol %, and a ratio of an area that the water-soluble high-molecular weight compound in a liquid form occupies in the gap is set to a value which falls within a range of 10 vol % to 99 vol %.

10 Claims, 13 Drawing Sheets

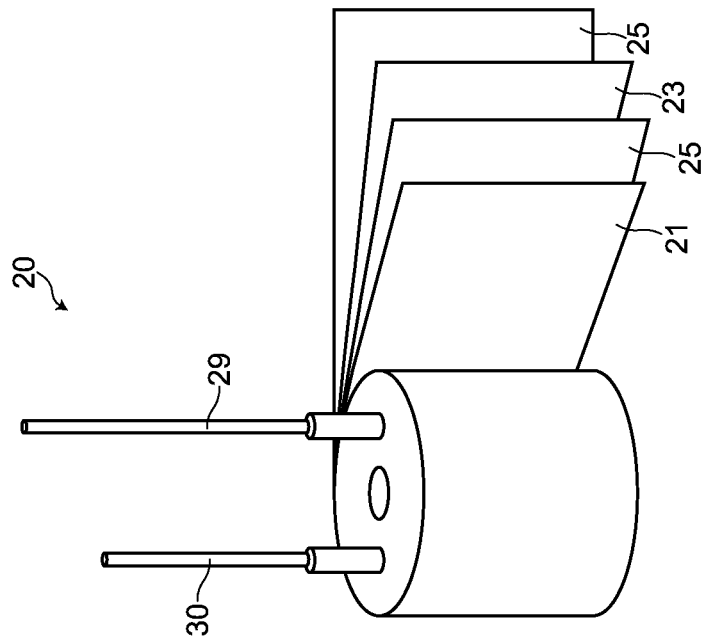
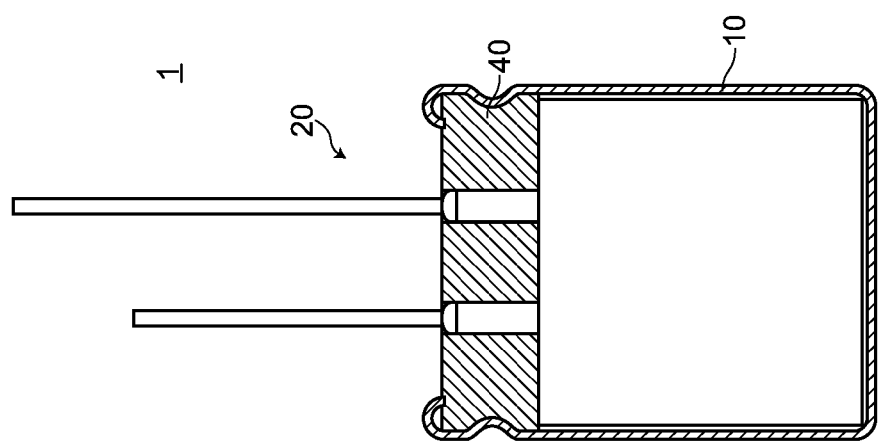
FIG.1B
FIG.1A

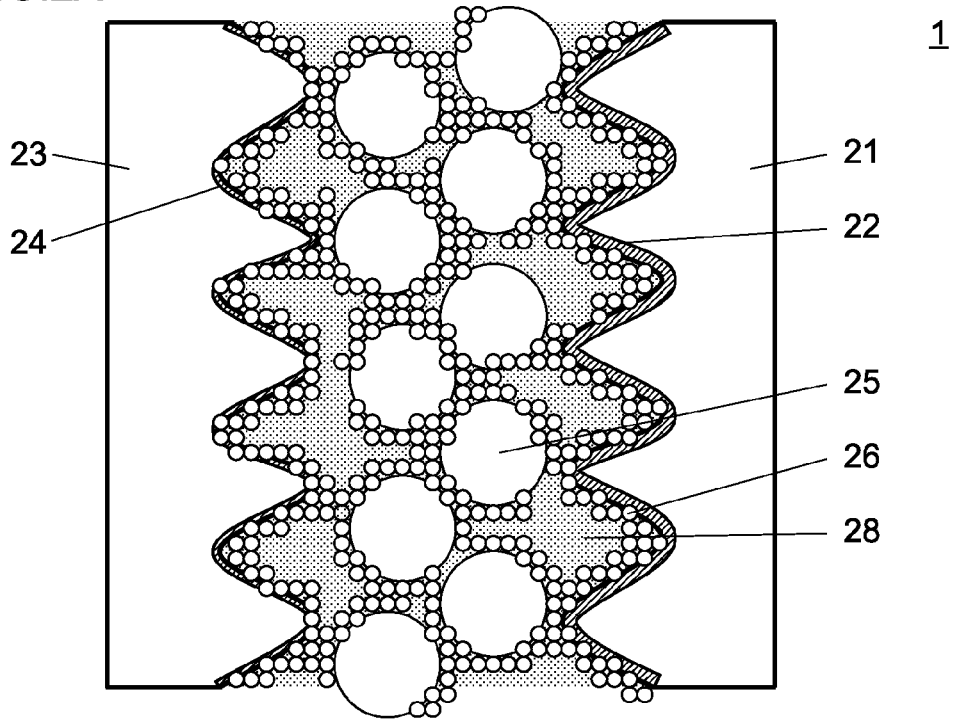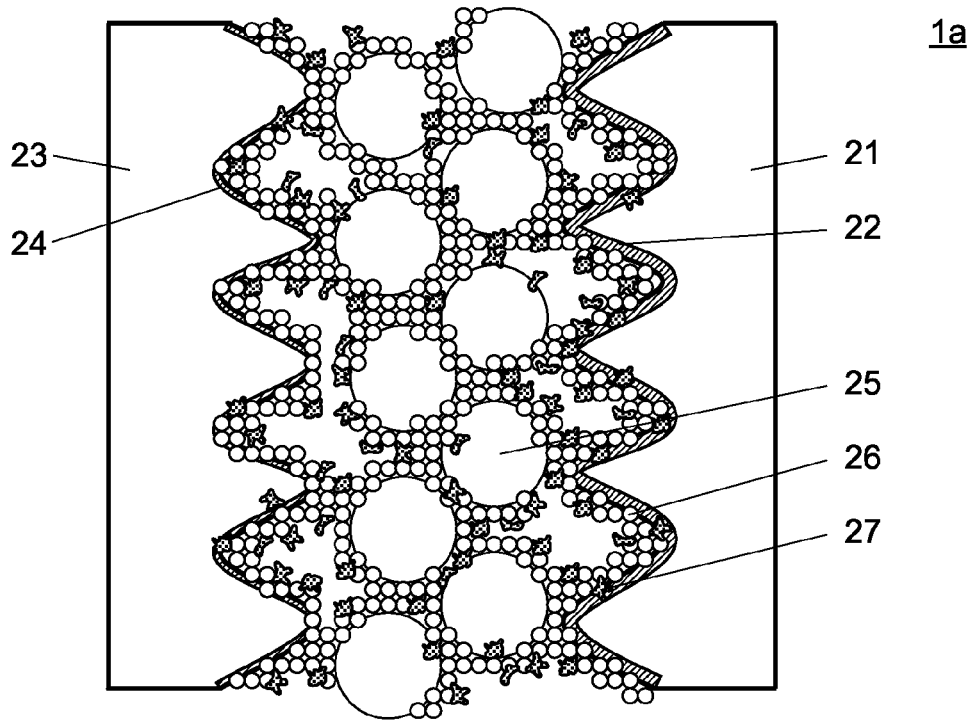

FIG.7A

| specimen | specimen 1 (present invention example) | specimen 2 (comparison example) | specimen 3 (comparison example) | specimen 4 (comparison example) | specimen 5 (comparison example) |
|---|---|---|---|---|---|
| introduced compound | PEG | γ-butyrolactone | | ethylene glycol | |
| configuration of introduced solution | water-soluble high-molecular weight compound in a liquid form | water-soluble low-molecular weight compound in a liquid form | electrolyte solution | water-soluble low-molecular weight compound in a liquid form | electrolyte |
| evaluation result of test example 1 | good | fair | fair | bad | bad |

FIG.7B

| specimen | specimen 6 (present invention example) | specimen 7 (comparison example) | specimen 8 (comparison example) | specimen 9 (comparison example) | specimen 10 (comparison example) |
|---|---|---|---|---|---|
| introduced compound | PEG | γ-butyrolactone | | ethylene glycol | |
| configuration of introduced solution | water-soluble high-molecular weight compound in a liquid form | water-soluble low-molecular weight compound in a liquid form | electrolyte | water-soluble low-molecular weight compound in a liquid form | electrolyte |
| evaluation result of test example 2 | good | bad | bad | good | good |

FIG.7C

| specimen | specimen 11 (present invention example) | specimen 12 (comparison example) |
|---|---|---|
| kind of capacitor | solid electrolyte capacitor | electrolyte capacitor |
| configuration of introduced solution | water-soluble high-molecular weight compound in a liquid form | electrolyte |
| evaluation result of test example 3 | good | good |

FIG.7D

| specimen | specimen 13 (present invention example) | specimen 14 (present invention example) | specimen 15 (comparison example) |
|---|---|---|---|
| configuration of introduced solution | water-soluble high-molecular weight compound in a liquid form | water-soluble high-molecular weight compound in a liquid form | electrolyte |
| the number of times that solid electrolyte is immersed | twice | once | once |
| evaluation result of test example 4 | good | good | bad |

SOLID ELECTROLYTIC CAPACITOR AND MANUFACTURING METHOD THEREOF

RELATED APPLICATION

The instant application claims the benefit of Japanese patent application Nos. 2014-205300 filed Oct. 3, 2014, 2014-217753 filed Oct. 24, 2014 and 2015-004587 filed Jan. 13, 2015, the entire disclosures of which are incorporated by reference herein.

BACKGROUND OF THE INVENTION

1. Field of the Invention

The present invention relates to a solid electrolytic capacitor and a manufacturing method thereof.

2. Description of the Related Art

Conventionally, there has been known a solid electrolytic capacitor where a solid electrolyte which contains "conductive fine particles containing a conductive high-molecular weight compound and a water-soluble high-molecular weight compound (hydrophilic high-molecular weight compound)" is filled (introduced) in a gap formed between an anode foil and a cathode foil (see International Publication WO2014-050913 (patent literature 1), for example). In the conventional solid electrolytic capacitor, the water-soluble high-molecular weight compound has an oxide film repairing property. In the conventional solid electrolytic capacitor, as such a water-soluble high-molecular weight compound, a water-soluble high-molecular weight compound in a solid form or in a viscous form is used (see FIG. 7 in patent literature 1).

In this specification, "gap" means not only a gap formed between an anode foil and a separator and a gap formed between a cathode foil and the separator but also gaps formed between fibers in the separator. "gap" also includes gaps formed in etching pits (recessed portions) formed on a surface of the anode foil or the cathode foil roughened by etching treatment.

In the conventional solid electrolytic capacitor, a solid electrolyte containing a water-soluble high-molecular weight compound is introduced into the gap formed between the anode foil and the cathode foil. Accordingly, even when a defect occurs in an oxide film in a step of preparing a solid electrolytic capacitor, it is possible to use moisture which the water-soluble high-molecular weight compound retains to repair the above-mentioned defective portion thus providing a solid electrolytic capacitor having a high breakdown strength and a low leakage current.

In the conventional solid electrolytic capacitor, a solid electrolyte containing a water-soluble high-molecular weight compound is introduced into the gap formed between the anode foil and the cathode foil. Accordingly, even when a defect occurs in an oxide film because of the use of the solid electrolytic capacitor for a long time, it is possible to use moisture which the water-soluble high-molecular weight compound retains to repair the above-mentioned defective portion thus providing a solid electrolytic capacitor having a long lifetime.

Further, according to the conventional solid electrolytic capacitor, the content of moisture in a water-soluble high-molecular weight compound contained in the solid electrolyte minimally changes (that is, moisture retaining ability of the water-soluble high-molecular weight compound is increased) and hence, moisture minimally scatters even when the solid electrolytic capacitor is used for a long time. A change in mode of a water-soluble high-molecular weight compound due to a change in temperature minimally occurs and hence, an oxide film minimally deteriorates even when a temperature elevating and lowering cycle between a normal temperature (a non-use state of the solid electrolytic capacitor) and a high temperature (a use state of the solid electrolytic capacitor) is repeated many times. As a result, even when the solid electrolytic capacitor is used under a severe condition for a long time, moisture can be retained for a long time and, at the same time, a change in mode of a water-soluble high-molecular weight compound can be suppressed for a long time thus providing a solid electrolytic capacitor having a long lifetime.

As a result, the conventional solid electrolytic capacitor is considered as a solid electrolytic capacitor having a high breakdown strength, a low leakage current and a long lifetime.

SUMMARY OF THE INVENTION

In the technical field of capacitors, there has been a constant demand for a capacitor having excellent property compared to conventional solid electrolytic capacitors with respect to at least one of a long lifetime property, a high breakdown strength property, a low resistance property and a low temperature resistance property. The technical field of solid electrolytic capacitors is not the exception.

The present invention has been made in view of the above-mentioned circumstances, and it is an object of the present invention to provide a solid electrolytic capacitor having excellent property with respect to at least one of a long lifetime property, a high breakdown strength property, a low resistance property and a low temperature resistance property compared to conventional solid electrolytic capacitors. It is another object of the present invention to provide a method of manufacturing a solid electrolytic capacitor for manufacturing such a solid electrolytic capacitor.

Inventors of the present invention have made extensive studies to achieve the above-mentioned object, and have found out that, with the use of a water-soluble high-molecular weight compound in a liquid form (see FIG. 2A, a water-soluble high-molecular weight compound 28) in place of a water-soluble high-molecular weight compound in a solid form or in a viscous form contained in a solid electrolyte (see FIG. 2B, a water-soluble high-molecular weight compound 27), even when a defect occurs in an oxide film of a solid electrolytic capacitor, the defect portion can be efficiently repaired compared to conventional solid electrolytic capacitors, and have completed the present invention. The present invention provides a solid electrolytic capacitor and a method of manufacturing the solid electrolytic capacitor described hereinafter.

[1] According to one aspect of the present invention, there is provided a solid electrolytic capacitor which includes: an anode foil having a surface on which an oxide film is formed; a cathode foil; and a separator disposed (interposed) between the anode foil and the cathode foil, wherein a solid electrolyte in a fine particle form made of a conductive high molecular weight compound and a water-soluble high-molecular weight compound in a liquid form are introduced into a gap formed between the anode foil and the cathode foil in a state where the water-soluble high-molecular weight compound in a liquid form surrounds the solid electrolyte, and a ratio of an area (space) that the solid electrolyte occupies in the gap is set to a value which falls within a range of 1 vol % to 30 vol %, and a ratio of an area that the water-soluble high-molecular weight compound in a liquid form occupies in the gap is set to a value which falls within a range of 10 vol % to 99 vol %.

According to the solid electrolytic capacitor of the present invention, a water-soluble high-molecular weight compound in a liquid form is introduced into a gap formed between the anode foil and the cathode foil. Accordingly, even when a defect occurs in an oxide film because of the use of the solid electrolytic capacitor for a long time, the defective portion and the water-soluble high-molecular weight compound in a liquid form easily come into contact with each other compared to conventional solid electrolytic capacitors and hence, the defective portion can be repaired more efficiently than the conventional solid electrolytic capacitors. As a result, the solid electrolytic capacitor of the present invention provides a solid electrolytic capacitor which can maintain a normal dielectric film for a longer time than the conventional solid electrolytic capacitors thus having a more excellent long lifetime property than the conventional solid electrolytic capacitors.

Further, according to the solid electrolytic capacitor of the present invention, a water-soluble high-molecular weight compound in a liquid form is introduced into the gap formed between the anode foil and the cathode foil such that the water-soluble high-molecular weight compound surrounds the solid electrolyte and hence, a dopant (of a strong acid) which may be liberated from a solid electrolyte or a portion of the dopant is prevented from being in contact with fibers of the separator whereby a deterioration reaction of the separator by the dopant can be suppressed. As a result, the solid electrolytic capacitor of the present invention provides a solid electrolytic capacitor having a more excellent long lifetime property than the conventional solid electrolytic capacitors also from this viewpoint.

The reason the ratio of the area that the water-soluble high-molecular weight compound in a liquid form occupies in the gap is set to a value which falls within a range of 10 vol % to 99 vol % is as follows. That is, when the ratio of the area that the water-soluble high-molecular weight compound in a liquid form occupies in the gap is smaller than 10 vol %, a defective portion of an oxide film and the water-soluble high-molecular weight compound in a liquid form minimally come into contact with each other and hence, there may be a case where the defective portion cannot be efficiently repaired. On the other hand, when the ratio of the area that the water-soluble high-molecular weight compound in a liquid form occupies in the gap is larger than 99%, the ratio of the area that the solid electrolyte occupies in the gap becomes small and hence, an equivalent series resistance (ESR) of resistance components of the capacitor is increased. From this viewpoint, it is more preferable that the ratio of the area that water-soluble high-molecular weight compound in a liquid form occupies in the gap be set to 20 vol % or more, and it is further preferable that the ratio of the area that water-soluble high-molecular weight compound in a liquid form occupies in the gap be set to 30 vol % or more. Further, it is preferable that the ratio of the area that the water-soluble high-molecular weight compound in a liquid form occupies in the gap be 96 vol % or less, and it is further preferable that the ratio of the area that the water-soluble high-molecular weight compound in a liquid form occupies in the gap be set to 90 vol % or less.

The reason the ratio of the area that the solid electrolyte occupies in the gap is set to a value which falls within a range of 1 vol % to 30 vol % is as follows. That is, when the ratio of the area that the solid electrolyte occupies in the gap is smaller than 1 vol %, an equivalent series resistance (ESR) of resistance components of the capacitor becomes large. On the other hand, when the ratio of the area that the solid electrolyte occupies in the gap is larger than 30 vol %, in steps of preparing the solid electrolytic capacitor, the gap is liable to be clogged by the solid electrolyte so that the manufacture of the solid electrolytic capacitor becomes difficult. From this viewpoint, it is more preferable that the ratio of the area that the solid electrolyte occupies in the gap be set to 1.5 vol % or more, and it is further more preferable that the ratio of the area that the solid electrolyte occupies in the gap be set to 2 vol % or more. On the other hand, it is more preferable that the ratio of the area that the solid electrolyte occupies in the gap be set to 25 vol % or less, and it is further more preferable that the ratio of the area that the solid electrolyte occupies in the gap be set to 20 vol % or less.

According to the solid electrolytic capacitor of the present invention, a water-soluble high-molecular weight compound is used instead of a general-type solvent and hence, the water-soluble high-molecular weight compound minimally passes through a sealing member and scatters to the outside. Accordingly, the solid electrolytic capacitor of the present invention provides a solid electrolytic capacitor where an action of repairing an oxide film is maintained for a long time.

[2] In the solid electrolytic capacitor of the present invention, it is preferable that an average particle size of the solid electrolyte in a fine particle form be set to a value which falls within a range of 1 nm to 300 nm.

The reason an average particle size of solid electrolyte in a fine particle form is set to a value which falls within a range of 1 nm to 300 nm is as fallows. That is, when the average particle size of solid electrolyte in a fine particle form is less than 1 nm, there may be a case where the manufacture of the solid electrolyte in a fine particle form becomes difficult. On the other hand, when the average particle size of solid electrolyte in a fine particle form is larger than 300 nm, there may be a case where it is difficult to introduce a solid electrolyte in a fine particle form into etching pits (recessed portions) formed on a surface of the anode foil. From this viewpoint, it is preferable that the average particle size of solid electrolyte in a fine particle form be set to 2 nm or more, and it is further more preferable that the average particle size of solid electrolyte in a fine particle form be set to 3 nm or more. It is further more preferable that the average particle size of solid electrolyte in a fine particle form be set to 200 nm or less, and it is further more preferable that average particle size of solid electrolyte in a fine particle form be set to 100 nm or less.

[3] In the solid electrolytic capacitor of the present invention, it is preferable that the water-soluble high-molecular weight compound in a liquid form have an oxide film repairing property.

With such a configuration, in the same manner as conventional solid electrolytic capacitors, it is possible to provide a solid electrolytic capacitor having a high breakdown strength, a low leakage current and a long lifetime.

[4] In the solid electrolytic capacitor of the present invention, it is preferable that a water-soluble high-molecular weight compound in a liquid form be a mixed material made of two or more kinds of water-soluble high-molecular weight compounds having different molecular weights.

In proving the solid electrolytic capacitor which contains a water-soluble high-molecular weight compound, from a viewpoint of lowering an equivalent series resistance (ESR) at a low temperature, it is preferable to use a water-soluble high-molecular weight compound having a small molecular weight. The reason is as follows. A high molecule having a large molecular weight starts the solidification thereof at a low temperature of 10° C. or below and, at the time of starting the solidification, a network of the solid electrolyte is broken thus causing the increase of an ESR of the solid electrolytic capacitor. On the other hand, a water-soluble high-molecular weight compound having a small molecular weight has a lower solidification point than a water-soluble high-molecular weight compound having a large molecular weight and hence, when the solid electrolytic capacitor which uses a water-soluble high-molecular weight compound having a small molecular weight is brought into a low temperature state, a water-soluble high-molecular weight compound in a liquid form is minimally solidified so that the network of the solid electrolytes formed of solid electrolytes in a fine particle form is minimally broken. Accordingly, it is possible to suppress the increase of an equivalent series resistance (ESR) thus providing a solid electrolytic capacitor having an excellent low temperature resistance property.

However, a water-soluble high-molecular weight compound having a small molecular weight has a property that such a water-soluble high-molecular weight compound easily passes through a sealing member and hence, when the water-soluble high-molecular weight compound is used singly, there may be a case where a water-soluble high-molecular weight compound in a liquid form cannot be retained over a long period. By taking into account such a case, in the present invention, two or more kinds of water-soluble high-molecular weight compounds having different molecular weights are used. In this case, with the use of water-soluble high-molecular weight compound having a small molecular weight and a water-soluble high-molecular weight compound having a larger molecular weight than the water-soluble high-molecular weight compound having a small molecular weight in mixture, a solidification stress at the time of low temperature can be alleviated so that the solid electrolytic capacitor can acquire both of an effect of lowering an equivalent series resistance (ESR) at a low temperature and an effect of making a water-soluble high-molecular weight compound minimally pass through a sealing member and scatter to the outside. As a result, the solid electrolytic capacitor of the present invention provides a solid electrolytic capacitor having a favorable low temperature resistance property and a long lifetime.

[5] In the solid electrolytic capacitor of the present invention, out of two or more kinds of water-soluble high-molecular weight compounds having different molecular weights, it is preferable that a molecular weight of the water-soluble high-molecular weight compounds having the largest molecular weight be 1.2 or more times as large as a molecular weight of the water-soluble high-molecular weight compound having the smallest molecular weight.

With such a configuration, the present invention provides a solid electrolytic capacitor whose low temperature resistance property is further improved. The reason the molecular weight of the water-soluble high-molecular weight compound having the largest molecular weight is set 1.2 or more times as large as the molecular weight of the water-soluble high-molecular weight compound having the smallest molecular weight is as follows. That is, when the molecular weight of the water-soluble high-molecular weight compound having the largest molecular weight is smaller than a value which is less than 1.2 times as large as the molecular weight of the water-soluble high-molecular weight compound having the smallest molecular weight, solidification points of the respective water-soluble high-molecular weight compounds are concentrated within an extremely narrow temperature range and hence, the water-soluble high-molecular weight compound easily passes through the sealing member whereby it is difficult for the solid electrolytic capacitor to acquire both of an effect of lowering an equivalent series resistance at a low temperature and an effect of suppressing the transmission of the water-soluble high-molecular weight compound through the sealing member.

[6] In the solid electrolytic capacitor of the present invention, it is preferable that the ratio of the water-soluble high-molecular weight compound having the largest molecular weight out of two or more kinds of high-molecular weight compounds having different molecular weights with respect to the water-soluble high-molecular weight compound in a liquid form be set to a value which falls within a range of 20 vol % to 80 vol %.

The reason the ratio of water-soluble high-molecular weight compound having the largest molecular weight out of two or more kinds of water-soluble high-molecular weight compounds having different molecular weights with respect to the water-soluble high-molecular weight compound in a liquid form is set to a value which falls within a range of 20 vol % to 80 vol % is as follows. That is, when the ratio is less than 20 vol %, the ratio of water-soluble high-molecular weight compound having the smallest molecular weight is excessively increased so that the water-soluble high-molecular weight compound passes through the sealing member and easily scatters to the outside. On the other hand, when the ratio is larger than 80 vol %, the water-soluble high-molecular weight compound having the largest molecular weight is excessively increased thus reducing an effect of lowering an equivalent series resistance at a low temperature.

[7] In the solid electrolytic capacitor of the present invention, it is preferable that the water-soluble high-molecular weight compound be polyalkylene oxide, water-soluble silicone, branched polyether or derivatives of these materials.

All of the above-mentioned water-soluble high-molecular weight compounds have a large number of oxygen atoms thus having a high oxidizing ability. Accordingly, by adopting the above-mentioned configurations, even when a defeat occurs in an oxide film in the case where the solid electrolytic capacitor is used for a long time, a high oxidizing ability which the above-mentioned water-soluble high-molecular weight compound has can be used to repair the defective portion and hence, the solid electrolytic capacitor of the present invention can provide a solid electrolytic capacitor having a more excellent long lifetime property.

[8] In the solid electrolytic capacitors of the present invention, when the water-soluble high-molecular weight compound is a polyalkylene oxide, a molecular weight of the water-soluble high-molecular weight compound is set to a value which falls within a range of 100 to 1000, and when the water-soluble high-molecular weight compound is a water-soluble silicone, branched polyether, a derivative of a polyalkylene oxide, a derivative of a water-soluble silicone, or a derivative of branched polyether, a molecular weight of the water-soluble high-molecular weight compound is set to a value which falls within a range of 200 to 3000.

The reason the molecular weight of the water-soluble high-molecular weight compound is set to a value which falls within a range of 100 to 1000 when the water-soluble high-molecular weight compound is polyalkylene oxide is as follows. That is, when a molecular weight of the water-soluble high-molecular weight compound is smaller than 100, the water-soluble high-molecular weight compound passes through a sealing member and easily scatters to the outside. On the other hand, when the molecular weight of water-soluble high-molecular weight compound is larger than 1000, an effect of reducing an equivalent series resistance at a low temperature is decreased.

The reason a molecular weight of water-soluble high-molecular weight compound is set to a value which falls within a range of 200 to 3000 when the water-soluble high-molecular weight compound is water-soluble silicone, branched polyether, a derivative of a polyalkylene oxide, a derivative of a water-soluble silicone or a derivative of branched polyether is as follows. That is, when a molecular weight of the water-soluble high-molecular weight compound is smaller than 200, the water-soluble high-molecular weight compound passes through a sealing member and easily scatters to the outside. On the other hand, when the molecular weight of water-soluble high-molecular weight compound is larger than 3000, an effect of reducing an equivalent series resistance at a low temperature is decreased.

[9] A method of manufacturing a solid electrolytic capacitor of the present invention includes: a first step of preparing a capacitor element which includes an anode foil having a surface on which an oxide film is formed, a cathode foil, and a separator arranged between the anode foil and the cathode foil; a second step of introducing a solid electrolyte in a fine particle form made of a conductive high-molecular weight compound into a gap formed between the anode foil and the cathode foil such that a ratio of an area that the solid electrolyte occupies in the gap is set to a value which falls within a range of 1 vol % to 30 vol %; and a third step of introducing a water-soluble high-molecular weight compound in a liquid form in the gap formed between the anode foil and the cathode foil such that the water-soluble high-molecular weight compound surrounds the solid electrolyte and a ratio of an area that the water-soluble high-molecular weight compound in a liquid form occupies in the gap is set to a value which falls within a range of 10 vol % to 99 vol % in this order.

According to the method of manufacturing a solid electrolytic capacitor of the present invention, it is possible to manufacture the solid electrolytic capacitor of the present invention having the above-mentioned excellent properties.

[10] In the method of manufacturing a solid electrolytic capacitor of the present invention, it is preferable that an average particle size of the solid electrolyte in a fine particle form be set to a value which falls within a range of 1 nm to 300 nm.

The reason an average particle size of the solid electrolyte in a fine particle form is set to a value which falls within a range of 1 nm to 300 nm is as described previously.

[11] In the method of manufacturing a solid electrolytic capacitor of the present invention, it is preferable that, in the second step, a solid electrolyte dispersion liquid in which the solid electrolyte is dispersed in a solvent be filled in the gap using a vacuum impregnation method or an immersion impregnation method and, thereafter, the solvent be removed from the gap thus introducing the solid electrolyte into the gap.

By adopting such a method, it is possible to easily introduce a predetermined amount of solid electrolyte into an extremely narrow gap formed between the anode foil and the cathode foil.

[12] In the method of manufacturing a solid electrolytic capacitor of the present invention, it is preferable that, in the third step, the water-soluble high-molecular weight compound in a liquid form be introduced into the gap by filling using a vacuum impregnation method or an immersion impregnation method.

By adopting such a method, it is possible to easily introduce a predetermined amount of water-soluble high-molecular weight compound in a liquid form into an extremely narrow gap formed between the anode foil and the cathode foil.

BRIEF DESCRIPTION OF DRAWINGS

FIGS. 1A and 1B are views for explaining a solid electrolytic capacitor 1 of an embodiment 1.
FIGS. 2A and 2B are views for explaining a main part of the solid electrolytic capacitor 1 of the embodiment 1.
FIGS. 7A to 7D are tables showing data on respective specimens used in test examples and evaluation results of the test examples.

DESCRIPTION OF PREFERRED EMBODIMENTS

Figure 3:
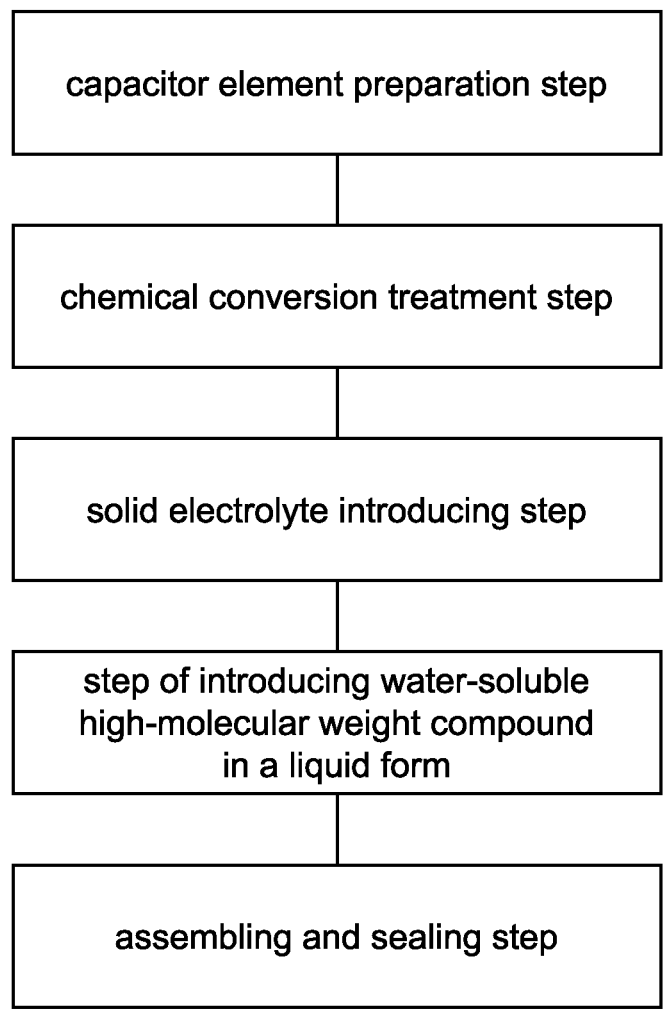
FIG. 3 is a flowchart for explaining a method of manufacturing the solid electrolytic capacitor of the embodiment 1.

Hereinafter, a solid electrolytic capacitor according to the present invention and a method of manufacturing thereof are explained based on embodiments shown in the drawings.

Embodiment 1

1. Configuration of Solid Electrolytic Capacitor 1 of Embodiment 1

FIGS. 1A and 1B are views for explaining the solid electrolytic capacitor 1 of the embodiment 1. FIG. 1A is a cross-sectional view of the solid electrolytic capacitor 1 of the embodiment 1, and FIG. 1B is a perspective view of a capacitor element 20.

FIGS. 2A and 2B are views for explaining a main part of the solid electrolytic capacitor 1 of the embodiment 1. FIG. 2A is a cross-sectional view of the main part of the solid electrolytic capacitor 1, and FIG. 2B is a cross-sectional view of a main part of a conventional solid electrolytic capacitor 900 according to a comparison example.

The solid electrolytic capacitor 1 of the embodiment 1 is a winding-type solid electrolytic capacitor. As shown in FIGS. 1A and 1B, the solid electrolytic capacitor 1 includes: a bottomed cylindrical metal case 10; a capacitor element 20; and a sealing member 40.

A bottom surface portion of the metal case 10 has an approximately circular shape, and a valve (not shown in the drawing) is mounted on a portion of the bottom surface portion in the vicinity of the center of the bottom surface portion. Accordingly, the solid electrolytic capacitor 1 is configured such that, when an internal pressure is elevated, the valve is broken so that the internal pressure is released to the outside. A side surface portion of the metal case 10 is raised approximately vertically from an outer edge of the bottom surface portion. An opening portion of the metal case 10 is sealed by a sealing member 40, and two lead lines 29, 30 of the capacitor element 20 are pulled out to the outside through penetration holes formed in the sealing member 40.

The capacitor element 20 is accommodated in the inside of the metal case 10 and, as shown in FIG. 1B and FIG. 2A, includes: an anode foil 21; a cathode foil 23; and a separator 25 disposed or interposed between the anode foil 21 and the cathode foil 23 such that the anode foil 21 and the cathode foil 23 are wound in an overlapping state with the separator 25 interposed therebetween.

The anode foil 21 is made of valve metal such as aluminum, tantalum and niobium. After a surface of the anode foil 21 is roughened by an etching treatment, an oxide film 22 is formed on the surface of the anode foil 21 by a chemical conversion treatment (see FIG. 2A). In the same manner as the anode foil 21, the cathode foil 23 is also made of valve metal such as aluminum, tantalum or niobium. After a surface of the cathode foil 23 is roughened by an etching treatment in the same manner as the anode foil 21, an oxide film 24 is formed on the surface of the cathode foil 23 by natural oxidation. The anode foil 21 is electrically connected with the lead line 29, and the cathode foil 23 is electrically connected with the lead line 30 respectively.

A width of the separator 25 is set larger than winding widths of the anode foil 21 and the cathode foil 23, and the separator 25 is overwrapped such that the separator 25 sandwiches the anode foil 21 and the cathode foil 23. The separator 25 may be preferably formed using cellulose fiber having chemical affinity with a conductive high-molecular weight particle and a water-soluble high-molecule or synthetic resin such as nylon, PET, or PPS having excellent heat resistant property, and may be formed using heat resistant cellulose paper or heat resistant flameproof paper, for example.

In the solid electrolytic capacitor 1 of the embodiment 1 formed in this manner, unlike the conventional solid electrolytic capacitor where a water-soluble high-molecular weight compound 27 in a solid form or in a viscous form filled in (introduced into) the gap formed between the anode foil 21 and the cathode foil 23 (see FIG. 2B), the solid electrolyte 26 made of a conductive high-molecular weight compound in a fine particle form and the water-soluble high-molecular weight compound 28 in a liquid form are introduced into the gap formed between the anode foil 21 and the cathode foil 23 such that the water-soluble high-molecular weight compound 28 in a liquid form surrounds the solid electrolyte 26 (see FIG. 2A).

The ratio of the area that the solid electrolyte 26 in a liquid form occupies in the gap is set to a value which falls within a range of 1 vol % to 30 vol %, and the ratio of the area that the water-soluble high-molecular weight compound 28 in a liquid form is set to a value which falls within a range of 10 vol % to 99 vol %. Further, an average particle size of the solid electrolyte in a fine particle form is set to a value which falls within a range of 1 nm to 300 nm (20 nm, for example).

The conductive high-molecular weight compound is formed of polyethylenedioxythiophene, polythiophene, polypyrrole, or polyaniline.

The solid electrolyte 26 may be an electrolyte which further contains a dopant selected from a group consisting of a polystyrene sulfonic acid, a toluene sulfonic acid, an alkylbenzene sulfonic acid and a naphthalene sulfonic acid.

The water-soluble high-molecular weight compound is polyalkylene oxide, water-soluble silicone, branched polyether or derivatives of these materials. For example, the water-soluble high-molecular weight compound is polyethylene glycol (PEG). A molecular weight of water-soluble high-molecular weight compound is set to a value which falls within a range of 100 to 1000, and is 300, for example.

The sealing member 40 possesses high gas tightness for preventing the scattering of a water-soluble high-molecular weight material from the inside to the outside of the solid electrolytic capacitor 1 and the intrusion of a foreign substance (for example, moisture, chloride, fine powder or the like) into the inside of the electrolyte capacitor 1 from the outside. The sealing member 40 has a suitable amount of elasticity for ensuring close contact with the metal case 10 and the lead lines 29, 30. Further, as a material for forming the sealing member 40, it is preferable to select a material which allows the sealing member 40 to maintain properties relating to such gas tightness and elasticity in a high-temperature state as well as in a low-temperature state. As such a material, for example, a rubber material such as ethylene-propylene terpolymer (EPT), isobutylene-isoprene rubber (IIR), EPT-IIR blended rubber, silicone rubber or a rubber composite material laminating a resin such as a phenol resin, an epoxy resin, or a fluororesin and rubber with each other can be preferably used. Among these materials, isobutylene-isoprene rubber (IIR) having excellent gas tightness can be particularly preferably used.

2. Method of Manufacturing Solid Electrolytic Capacitor of Embodiment 1

The solid electrolytic capacitor 1 of the embodiment 1 can be manufactured in the following manner.

FIG. 3 is a flowchart for explaining the method of manufacturing the solid electrolytic capacitor of the embodiment 1.

Figure 6:
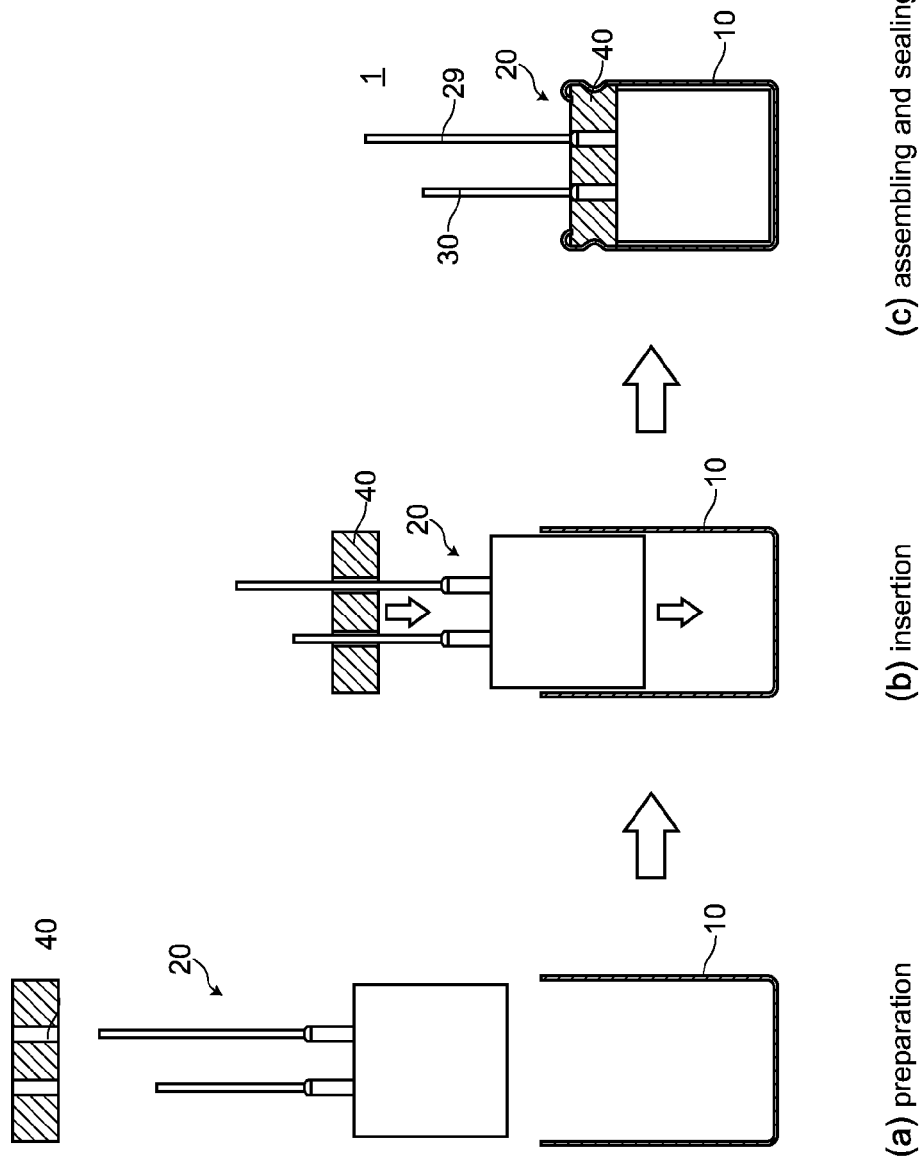
FIGS. 6A to 6C are views for explaining the method of manufacturing the solid electrolytic capacitor 1 of the embodiment 1.

FIGS. 4A to 6C are views for explaining the method of manufacturing the solid electrolytic capacitor of the embodiment 1. That is, FIGS. 4A to 4D are views for explaining a step of introducing a solid electrolyte, FIGS. 5A to 5C are views for explaining a step of introducing a liquid water-soluble high-molecular weight compound in a liquid form, and FIGS. 6A to 6C are views for explaining an assembling and a sealing step.

As shown in FIG. 3, the method of manufacturing the solid electrolytic capacitor of the embodiment 1 includes; a capacitor element preparation step (first step); a chemical conversion treatment step; a solid electrolyte introducing step (second step); a liquid water-soluble high-molecular weight compound introducing step (third step); and an assembling and sealing step in this order. Hereinafter, the method of manufacturing the solid electrolytic capacitor of the embodiment 1 is explained in accordance with the respective steps.

(1) Capacitor Element Preparation Step (First Step)

First, a capacitor element 20 which includes an anode foil 21, a cathode foil 23, and a separator 25 disposed between the anode foil 21 and the cathode foil 23 is prepared (see FIG. 1B). An oxide film 22 is formed on the anode foil 21 by applying a predetermined voltage of 2 to 400V to a surface of an aluminum foil which is roughened by a surface roughening treatment thus performing a chemical conversion treatment. To be more specific, a capacitor element 20 is prepared by winding the anode foil 21 having an uneven surface and having an oxide film 22 formed on the uneven surface and the cathode foil 23 having an uneven surface in an overlapping manner with the separator 25 interposed therebetween. A lead line 29 is connected to the anode foil 21, and a lead line 30 is connected to the cathode foil 23.

(2) Chemical Conversion Treatment Step

Next, the capacitor element 20 is immersed in a chemical solution (aqueous solution of ammonium adipate, ammonium borate, ammonium phosphate, ammonium glutarate, ammonium azelate, ammonium tartrate, ammonium sebacate, ammonium pimelate, ammonium suberate or the like, for example) in a chemical solution tank (not shown in the drawing) and, at the same time, a predetermined voltage (100V, for example) is applied between the lead line 29 on an anode side and the chemical solution for 5 minutes. Due to such a chemical conversion treatment, an oxide film defect portion which exists on an end portion of the anode foil 21 and an oxide film defect portion which may exist in a surface of the anode foil 21 are repaired (not shown in the drawing).

(3) Solid Electrolyte Introducing Step (Second Step)

Next, a solid electrolyte 26 in a fine particle made of a conductive high-molecular weight compound is introduced into a gap formed between the anode foil 21 and the cathode foil 23 such that a ratio of an area that the solid electrolyte 26 occupies in the gap is set to a value which falls within a range of 2 vol % to 30 vol %. In the solid electrolyte introducing step, a solid electrolyte dispersion liquid prepared by dispersing the solid electrolyte 26 in a solvent is filled in the gap and, thereafter, the solvent is removed from the gap thus introducing the solid electrolyte 26 into the gap.

Figure 4:
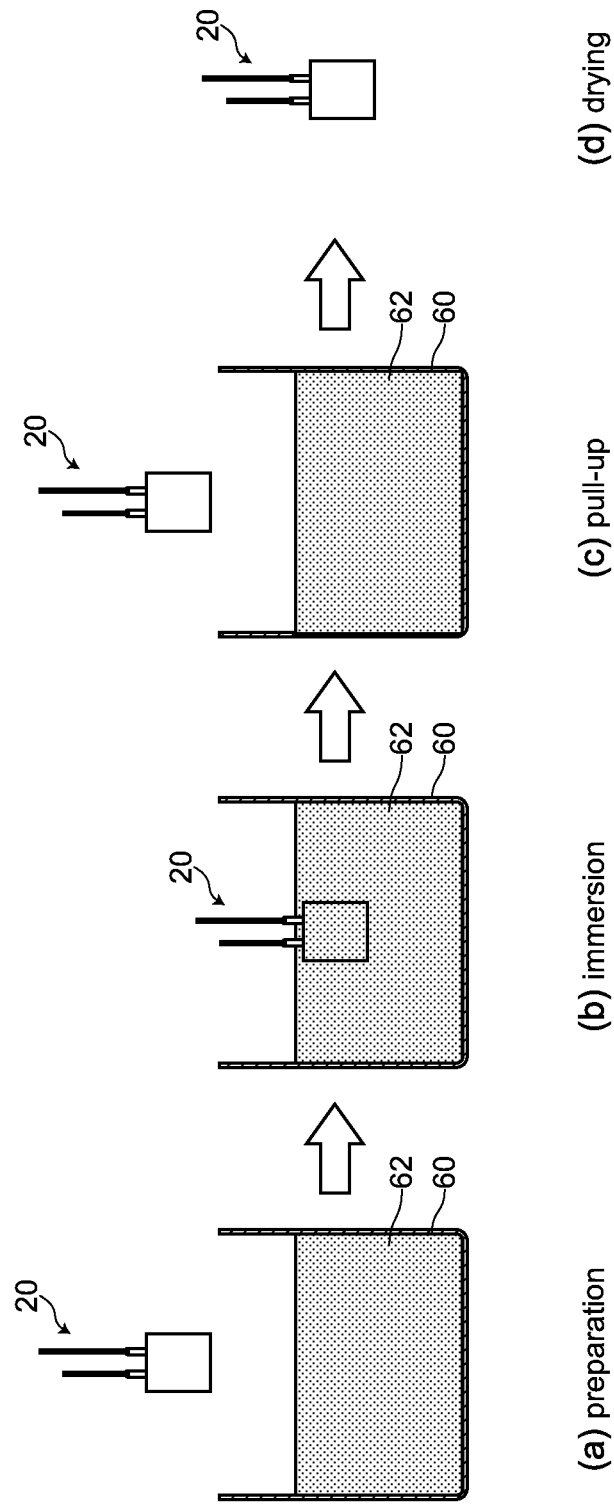
FIGS. 4A to 4D are views for explaining the method of manufacturing the solid electrolytic capacitor 1 of the embodiment 1.
Figure 5:
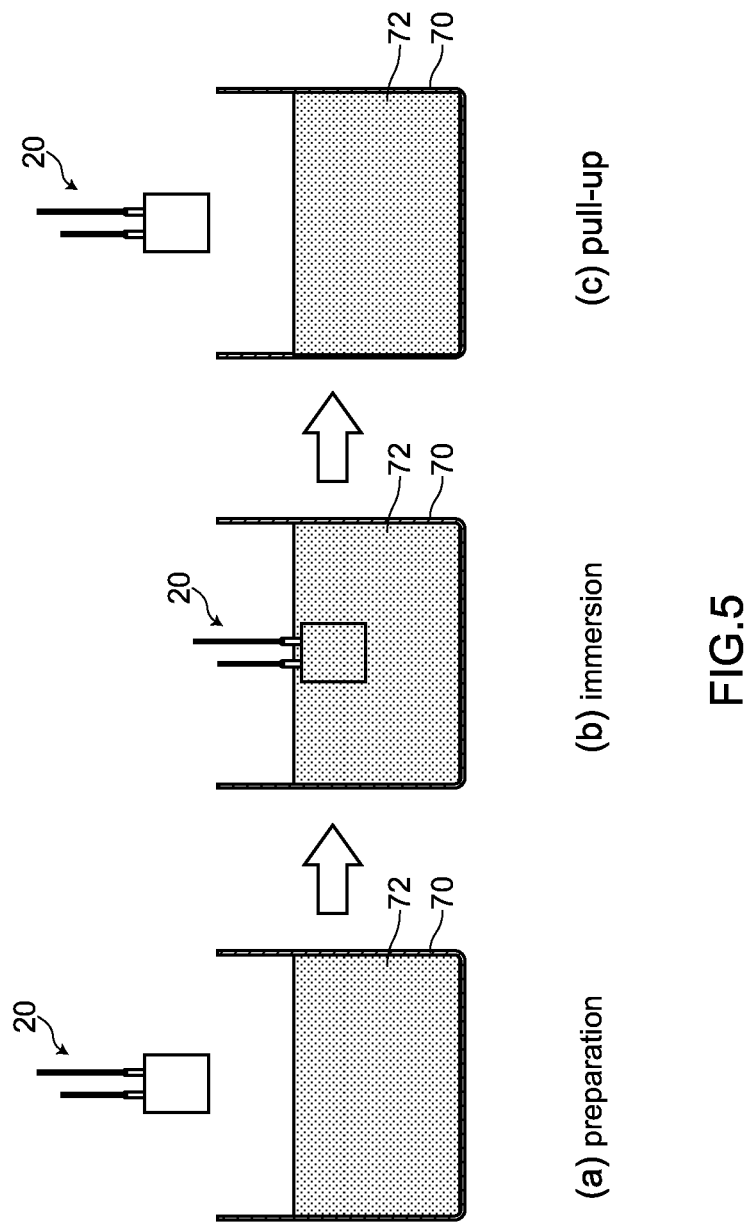
FIGS. 5A to 5C are views for explaining the method of manufacturing the solid electrolytic capacitor 1 of the embodiment 1.

To be more specific, the solid electrolyte introducing step is performed in the following manner. That is, as shown in FIG. 4, a solid electrolyte dispersion liquid 62 prepared by dispersing the solid electrolyte 26 in a solvent is filled in a solid electrolyte introducing tank 60 (see FIG. 4A) and, thereafter, the capacitor element 20 is immersed in the solid electrolyte dispersion liquid 62 (polymer concentration being set to 2 vol %) by an immersion impregnation method (see FIG. 4B). Next, the capacitor element 20 is taken out from the solid electrolyte dispersion liquid 62 (see FIG. 4C) and, thereafter, heat treatment is applied to the capacitor element 20 (see FIG. 4D). These steps are repeated twice so as to set a ratio of the area that the solid electrolyte occupies in the gap to 4 vol %. The solid electrolyte dispersion liquid can be prepared in the following manner. That is, (1) a solid electrolyte in a fine particle form made of a conductive high-molecular weight compound (PEDOT polymer, for example) to which a dopant or an emulsifier is added is prepared by applying polymerization (radical polymerization or oxidation polymerization) to a monomer in a suspended state (EDOT monomer, for example), and (2) the solid electrolyte in a fine particle form is dispersed in a predetermined solvent so as to prepare the solid electrolyte dispersion liquid. An average particle size of the solid electrolyte in a fine particle form can be adjusted by suitably setting a polymerization reaction condition (the concentration of an initiator, a monomer, or a polymerization assistant, a reaction temperature, a stirring condition of a reaction solution or the like, for example). The average particle size of the solid electrolyte in a fine particle form can be also adjusted by applying a known grinding treatment (stirring grinding treatment, vibratory grinding or the like, for example). A particle size of the solid electrolyte in a fine particle form can be made uniform by performing a fractionation filtration treatment.

In order to set the ratio of the area that the solid electrolyte occupies in the gap to a value larger than 4 vol %, the step that "the capacitor element 20 is immersed in the solid electrolyte dispersion liquid 62 and, then, the capacitor element 20 is taken out from the solid electrolyte dispersion liquid 62 and, thereafter, a heat treatment is applied to the capacitor element 20" is further repeated several times. The ratio of the area that the solid electrolyte occupies in the gap may be increased also by a suitable method such as a method of increasing a polymer concentration of the solid electrolyte dispersion liquid 62. The ratio of the area that the solid electrolyte occupies in the gap may be set to 2 vol % by performing the above-mentioned step only once. The ratio of the area that the solid electrolyte occupies in the gap may be set to a value less than 2 vol % by a suitable method such as a method of decreasing a polymer concentration of the solid electrolyte dispersion liquid 62.

An introducing amount (volume) of a solid electrolyte can be calculated by measuring a weight of a capacitor element in respective states (before immersion and after immersion and drying) and by converting the difference in weight between before immersion and after drying into the difference in volume using a density of the solid electrolyte. Accordingly, by measuring and calculating a gap (volume) in the capacitor element before immersion in advance, the ratio of the area that the solid electrolyte occupies in the gap can be calculated.

(4) Introducing of Water-Soluble High-Molecular Weight Compound in a Liquid Form (Third Step)

Next, the water-soluble high-molecular weight compound 28 in a liquid form is introduced into the gap formed between the anode foil 21 and the cathode foil 23 such that the water-soluble high-molecular weight compound 28 in a liquid form surrounds the solid electrolyte 26 and that the ratio of the area that the water-soluble high-molecular weight compound 28 occupies in the gap is set to a value which falls within a range of 10 vol % to 99 vol %.

To be more specific, a water-soluble high-molecular weight compound filling step is performed in the following manner. That is, as shown in FIGS. 5A and 5B, a liquid 72 made of a water-soluble high-molecular weight compound is filled in a water-soluble high-molecular weight compound filling tank 70 (see FIG. 5A) and, thereafter, the capacitor element 20 is immersed in the liquid 72 made of a water-soluble high-molecular weight compound by an immersion impregnation method (see FIG. 5B) so as to introduce the water-soluble high-molecular weight compound 28 in a liquid form into the gap by filling. Next, the capacitor element 20 is taken out from the liquid 72 made of a water-soluble high-molecular weight compound (see FIG. 5C) and, an excess amount or a shortage amount of the water-soluble high-molecular weight compound is adjusted, and it is ascertained that an introducing amount of the water-soluble high-molecular weight compound 28 in a liquid form becomes a predetermined introducing amount (weight).

An introducing amount (volume) of the water-soluble high-molecular weight compound 28 in a liquid form can be calculated by measuring a weight of a capacitor element in respective states (before immersion and after immersion) and by converting the difference in weight between before immersion and after drying into the difference in volume using a density of the water-soluble high-molecular weight compound in a liquid form. Accordingly, by measuring and calculating a gap (volume) in the capacitor element before immersion, the ratio of the area that the water-soluble high-molecular weight compound 28 in a liquid form occupies in the gap can be calculated.

(5) Assembling and Sealing Step

Lastly, the sealing member 40 is mounted on the capacitor element 20 (see FIG. 6A), the capacitor element 20 is inserted into the metal case 10 (see FIG. 6B) and, thereafter, the metal case 10 is caulked in the vicinity of an opening end of the metal case 10 (see FIG. 6C). The sealing member 40 is formed by using isobutylene-isoprene rubber (IIR), for example. In place of the isobutylene-isoprene rubber (IIR), a rubber material such as ethylene-propylene terpolymer (EPT), EPT-IIR blended rubber, or silicone rubber or a rubber composite material formed by laminating a resin such as a phenol resin (Bakelite), an epoxy resin, or a fluororesin and rubber with each other may be also used. Thereafter, an aging step is performed by applying a predetermined voltage to the capacitor element 20 under a high temperature atmosphere. In accordance with the above-mentioned steps, the solid electrolytic capacitor 1 according to the embodiment 1 is completed.

3. Advantageous Effect of Solid Electrolytic Capacitor 1 of Embodiment 1 and Manufacturing Method Thereof According to the solid electrolytic capacitor 1 of the embodiment 1, the water-soluble high-molecular weight compound 28 in a liquid form is introduced into the gap formed between the anode foil 21 and the cathode foil 23. Accordingly, even when a defect occurs in an oxide film because of the use of the solid electrolytic capacitor for a long time, the defective portion and the water-soluble high-molecular weight compound 28 in a liquid form easily come into contact with each other compared to conventional solid electrolytic capacitors and hence, the defective portion can be repaired more efficiently than conventional solid electrolytic capacitors. As a result, the solid electrolytic capacitor 1 of the embodiment 1 provides a solid electrolytic capacitor which can maintain a normal dielectric film for a longer time than conventional solid electrolytic capacitors thus having a more excellent long lifetime property than conventional solid electrolytic capacitors.

According to the solid electrolytic capacitor 1 of the embodiment 1, the water-soluble high-molecular weight compound 28 in a liquid form is introduced into the gap formed between the anode foil 21 and the cathode foil 23 such that the water-soluble high-molecular weight compound surrounds the solid electrolyte and hence, a dopant (of a strong acid) which may be liberated from the solid electrolyte 26 or a portion of the dopant is prevented from being in contact with fibers of the separator 25 whereby a deterioration reaction of the separator 25 by the dopant can be suppressed. As a result, the solid electrolytic capacitor 1 of the embodiment 1 provides a solid electrolytic capacitor having a more excellent long lifetime property than conventional solid electrolytic capacitors from this viewpoint.

The reason the ratio of the area that the water-soluble high-molecular weight compound 28 in a liquid form occupies in the gap is set to a value which falls within a range of 10 vol % to 99 vol % is as follows. That is, when the ratio of the area that the water-soluble high-molecular weight compound 28 in a liquid form occupies in the gap is smaller than 10 vol %, a defective portion of an oxide film and the water-soluble high-molecular weight compound 28 in a liquid form minimally come into contact with each other and hence, there may be a case where the defective portion cannot be efficiently repaired. On the other hand, when the ratio of the area that the water-soluble high-molecular weight compound 28 in a liquid form occupies in the gap is larger than 99%, the ratio of the area that the solid electrolyte 26 occupies in the gap becomes small and hence, there may a case where an equivalent series resistance (ESR) of resistance components of the capacitor is increased. From this viewpoint, it is more preferable that the ratio of the area that the water-soluble high-molecular weight compound 28 in a liquid form occupies in the gap be set to 20 vol % or more, and it is further preferable that the ratio of the area that the water-soluble high-molecular weight compound 28 in a liquid form occupies in the gap be set to 30 vol % or more. Further, it is more preferable that the ratio of the area that the water-soluble high-molecular weight compound 28 in a liquid form occupies in the gap be 96 vol % or less, and it is further preferable that the ratio of the area that the water-soluble high-molecular weight compound 28 in a liquid form occupies in the gap be set to 90 vol % or less.

The reason the ratio of the area that the solid electrolyte 26 occupies in the gap is set to a value which falls within a range of 1 vol % to 30 vol % is as follows. That is, when the ratio of the area that the solid electrolyte 26 occupies in the gap is smaller than 1 vol %, an equivalent series resistance (ESR) of resistance components of the capacitor may become large. On the other hand, when the ratio of the area that the solid electrolyte 26 occupies in the gap is larger than 30 vol %, in steps of preparing the solid electrolytic capacitor, the gap is easily clogged by the solid electrolyte 26 so that the manufacture of the solid electrolytic capacitor becomes difficult. From this viewpoint, it is more preferable that the ratio of the area that the solid electrolyte 26 occupies in the gap be set to 1.5 vol % or more, and it is further more preferable that the ratio of the area that the solid electrolyte 26 occupies in the gap be set to 2 vol % or more. On the other hand, it is more preferable that the ratio of the area that the solid electrolyte 26 occupies in the gap be set to 25 vol % or less, and it is further more preferable that the ratio of the area that the solid electrolyte 26 occupies in the gap be set to 20 vol % or less.

According to the solid electrolytic capacitor 1 of the embodiment 1, a water-soluble high-molecular weight compound is used instead of a general-type solvent and hence, the water-soluble high-molecular weight compound minimally passes through the sealing member 40 and scatters to the outside. Accordingly, the solid electrolytic capacitor 1 of the embodiment 1 provides a solid electrolytic capacitor where an action of repairing an oxide film is maintained for a long time.

According to the solid electrolytic capacitor 1 of the embodiment 1, an average particle size of the solid electrolyte 26 in a fine particle form is set to a value which falls within a range of 1 nm to 300 nm. Accordingly, the manufacture of the solid electrolyte in a fine particle form is easy, and it is easy to introduce a solid electrolyte in a fine particle form into etching pits (recessed portions) formed on a surface of the anode foil.

According to the solid electrolytic capacitor 1 of the embodiment 1, the water-soluble high-molecular weight compound 28 in a liquid form has an oxide film repairing property. Accordingly, in the same manner as conventional solid electrolytic capacitors, it is possible to provide a solid electrolytic capacitor having a high breakdown strength, a low leakage current and a long lifetime.

According to the solid electrolytic capacitor 1 of the embodiment 1, the water-soluble high-molecular weight compound is polyalkylene oxide, water-soluble silicone, branched polyether or derivatives of these materials, and all of the above-mentioned water-soluble high-molecular weight compounds have a large number of oxygen atoms thus having a high oxidizing ability. Accordingly, by adopting the above-mentioned configurations, even when a defeat occurs in an oxide film in the case where the solid electrolytic capacitor is used for a long time, a high oxidizing ability which the above-mentioned water-soluble high-molecular weight compound has can be used to repair the defective portion and hence, the solid electrolytic capacitor 1 of the embodiment 1 can provide a solid electrolytic capacitor having a more excellent long lifetime property.

The reason the molecular weight of the water-soluble high-molecular weight compound 28 is set to a value which falls within a range of 100 to 1000 when the water-soluble high-molecular weight compound is polyalkylene oxide is as follows. That is, when a molecular weight of the water-soluble high-molecular weight compound 28 is smaller than 100, the water-soluble high-molecular weight compound passes through the sealing member 40 and easily scatters to the outside. On the other hand, when the molecular weight of water-soluble high-molecular weight compound 28 is larger than 1000, an effect of reducing an equivalent series resistance at a low temperature is decreased.

The reason a molecular weight of water-soluble high-molecular weight compound 28 is set to a value which falls within a range of 200 to 3000 when the water-soluble high-molecular weight compound 28 is water-soluble silicone, branched polyether, a derivative of a polyalkylene oxide, a derivative of a water-soluble silicone or a derivative of branched polyether is as follows. That is, when a molecular weight of the water-soluble high-molecular weight compound is smaller than 200, the water-soluble high-molecular weight compound passes through the sealing member 40 and easily scatters to the outside. On the other hand, when the molecular weight of water-soluble high-molecular weight compound is larger than 3000, an effect of reducing an equivalent series resistance at a low temperature is decreased.

According to a method of manufacturing the solid electrolytic capacitor 1 of the embodiment 1, it is possible to manufacture the solid electrolytic capacitor 1 of the embodiment 1 having the above-mentioned excellent properties.

According to the method of manufacturing the solid electrolytic capacitor of the embodiment 1, in the second step, a solid electrolyte dispersion liquid 62 in which the solid electrolyte 26 is dispersed in a solvent is filled in the gap by an immersion impregnation method and, thereafter, the solvent is removed from the gap thus introducing the solid electrolyte 26 into the gap. Accordingly, it is possible to easily introduce a predetermined amount of solid electrolyte 26 into an extremely narrow gap formed between the anode foil 21 and the cathode foil 23.

According to the method of manufacturing the solid electrolytic capacitor of the embodiment 1, in the third step, a water-soluble high-molecular weight compound 28 is filled in the gap by an immersion impregnation method. Accordingly, it is possible to easily introduce a predetermined amount of water-soluble high-molecular weight compound 28 in a liquid form into an extremely narrow gap formed between the anode foil 21 and the cathode foil 23.

Embodiment 2

A solid electrolytic capacitor of an embodiment 2 (not shown in the drawing) basically has substantially the same configuration as the solid electrolytic capacitor 1 of the embodiment 1. However, the solid electrolytic capacitor of the embodiment 2 differs from the solid electrolytic capacitor 1 of the embodiment 1 in the configuration of a water-soluble high-molecular weight compound in a liquid form. That is, in the solid electrolytic capacitor of the embodiment 2, the water-soluble high-molecular weight compound in a liquid form is a mixed material made of two or more kinds of water-soluble high-molecular weight compounds having different molecular weights. To be more specific, the water-soluble high-molecular weight compound in a liquid form is formed of a PEG having a molecular weight of 100 and a PEG having a molecular weight of 600.

In the solid electrolytic capacitor of the embodiment 2, out of two kinds of water-soluble high-molecular weight compounds having different molecular weights (the PEG having a molecular weight of 100 and the PEG having a molecular weight of 600), the molecular weight of 600 of the water-soluble high-molecular weight compound having the largest molecular weight (PEG having molecular weight of 600) is 6 times as large as the molecular weight of 100 of the water-soluble high-molecular weight compound having the smallest molecular weight (PEG having molecular weight of 100). A ratio of the PEG having a molecular weight of 600 with respect to the water-soluble high-molecular weight compound in a liquid form is set to a value which falls within a range of 20 vol % to 80 vol %. For example, such a ratio of the PEG having a molecular weight of 600 is 50 vol %.

In this manner, the solid electrolytic capacitor of the embodiment 2 differs from the solid electrolytic capacitor 1 of the embodiment 1 in the configuration of the water-soluble high-molecular weight compound in a liquid form. However, in the same manner as the solid electrolytic capacitor 1 of the embodiment 1, the water-soluble high-molecular weight compound in a liquid form is filled in the gap formed between the anode foil and the cathode foil. Accordingly, even when a defect occurs in an oxide film because of the use of the solid electrolytic capacitor for a long time, the defective portion and the water-soluble high-molecular weight compound in a liquid form easily come into contact with each other compared to conventional solid electrolytic capacitors and hence, the defective portion can be repaired more efficiently than conventional solid electrolytic capacitors. As a result, the solid electrolytic capacitor of the embodiment 2 provides a solid electrolytic capacitor which can maintain a normal dielectric film for a longer time than conventional solid electrolytic capacitors thus having a more excellent long lifetime property than conventional solid electrolytic capacitors.

In the solid electrolytic capacitor of the embodiment 2, the water-soluble high-molecular weight compound in a liquid form is a mixed material made of two or more kinds of water-soluble high-molecular weight compounds having different molecular weights. Accordingly, the solid electrolytic capacitor of the embodiment 2 can acquire both an effect of lowering equivalent series resistance and an effect of making the water-soluble high-molecular weight compound minimally scatter to the outside through the sealing member simultaneously. As a result, the solid electrolytic capacitor of the embodiment 2 can provide a solid electrolytic capacitor having a favorable low temperature resistance property and a long lifetime.

Further, in the solid electrolytic capacitor of the embodiment 2, out of two kinds of water-soluble high-molecular weight compounds having different molecular weights, the molecular weight of the water-soluble high-molecular weight compound having the largest molecular weight is set 1.2 or more times as large as the molecular weight of the water-soluble high-molecular weight compound having the smallest molecular weight. Accordingly, the solid electrolytic capacitor of the embodiment 2 provides a solid electrolytic capacitor having a more favorable low temperature resistance property. The reason the molecular weight of the water-soluble high-molecular weight compound having the largest molecular weight is set 1.2 or more times as large as the molecular weight of the water-soluble high-molecular weight compound having the smallest molecular weight is as follows. That is, when the molecular weight of the water-soluble high-molecular weight compound having the largest molecular weight is set smaller than a value which is 1.2 times as large as the molecular weight of the water-soluble high-molecular weight compound having the smallest molecular weight, solidification points of respective water-soluble high molecular weight compounds are concentrated within an extremely narrow temperature range and hence, water-soluble high molecular weight compounds easily pass through the sealing member whereby it is difficult for the solid electrolytic capacitor of the embodiment 2 to acquire both an effect of lowering equivalent series resistance at a low temperature and an effect of suppressing the water-soluble high-molecular weight compound from passing through the sealing member simultaneously.

As described previously, out of two kinds of water-soluble high-molecular weight compounds having different molecular weights, a ratio of the water-soluble high-molecular weight compound having the largest molecular weight with respect to the water-soluble high-molecular weight compound in a liquid form is set to a value which falls within a range of 20 vol % to 80 vol %. The reason is as follows. That is, when the ratio of the water-soluble high-molecular weight compound having the largest molecular weight is smaller than 20 vol %, the ratio of the water-soluble high-molecular weight compound having the smallest molecular weight is excessively increased and hence, the water-soluble high molecular weight compounds easily pass through the sealing member and scatter to the outside. On the other hand, when the ratio of the water-soluble high-molecular weight compound having the largest molecular weight is larger than 80 vol %, the ratio of the water-soluble high-molecular weight compound having the largest molecular weight is excessively increased and hence, an effect of lowering equivalent series resistance at a low temperature is decreased.

The solid electrolytic capacitor of the embodiment 2 has substantially the same configuration as the solid electrolytic capacitor 1 of the embodiment 1 with respect to points other than the configuration of a water-soluble high molecular weight compound in a liquid form and hence, the solid electrolytic capacitor of the embodiment 2 has advantageous effects acquired by the corresponding configurations of the solid electrolytic capacitor 1 of the embodiment 1 among advantageous effects acquired by the solid electrolytic capacitor 1 of the embodiment 1.

TEST EXAMPLES

Test examples 1 to 5 described hereinafter are test examples for ascertaining that the solid electrolytic capacitors according to the present invention are solid electrolytic capacitors having an excellent long lifetime property, an excellent equivalent series resistance (ESR) property and an excellent low temperature resistance property.

FIG. 7A to 7D are tables showing data on respective specimens used in the test examples and evaluation results of the test examples. FIG. 7A is the table showing data on the respective specimens used in the test example 1 and the evaluation results of the test example 1, FIG. 7B is the table showing data on the respective specimens used in the test example 2 and the evaluation results of the test example 2, FIG. 7C is the table showing data on the respective specimens used in the test example 3 and the evaluation results of the test example 3, and FIG. 7D is the table showing data on the respective specimens used in the test example 4 and the evaluation results of the test example 4.

Test Example 1

The test example 1 is a test example for ascertaining that the solid electrolytic capacitor of the present invention is a solid electrolytic capacitor having a more excellent long lifetime property than the solid electrolytic capacitors of the respective comparison examples from a viewpoint of an equivalent series resistance (ESR).
1. Preparation of Specimens (1) Specimen 1 (Present Invention Example)

A solid electrolytic capacitor similar to the solid electrolytic capacitor 1 of the embodiment 1 is prepared and the solid electrolytic capacitor is used as a specimen 1. A polyethylenedioxythiophene (PEDOT) is used as a conductive high molecular weight compound. A solid electrolyte containing a dopant made of a polystyrene sulfonic acid is used as a solid electrolyte. Polyethylene glycol (PEG300) having a molecular weight of 300 is used as a water-soluble high-molecular weight compound in a liquid form.

(2) Specimen 2 (Comparison Example)

A solid electrolytic capacitor having the same configuration as the solid electrolytic capacitor of the specimen 1 except for that a solvent (γ-butyrolactone) is introduced into a gap formed between an anode foil and a cathode foil in place of PEG300 is prepared and the solid electrolytic capacitor is used as a specimen 2 (comparison example).

(3) Specimen 3 (Comparison Example)

A solid electrolytic capacitor having the similar configuration to the solid electrolytic capacitor of the specimen 1 except for that an electrolyte which uses γ-butyrolactone as a solvent is introduced into a gap formed between an anode foil and a cathode foil in place of PEG300 is prepared and the solid electrolytic capacitor is used as a specimen 3 (comparison example).

(4) Specimen 4 (Comparison Example)

A solid electrolytic capacitor having the similar configuration to the solid electrolytic capacitor of the specimen 1 except for that a solvent (ethylene glycol) is introduced into a gap formed between an anode foil and a cathode foil in place of PEG300 is prepared and the solid electrolytic capacitor is used as a specimen 4 (comparison example).

(5) Specimen 5 (Comparison Example)

A solid electrolytic capacitor having the similar configuration to the solid electrolytic capacitor of the specimen 1 except for that an electrolyte which uses an ethylene glycol as a solvent is introduced into a gap formed between an anode foil and a cathode foil in place of PEG300 is prepared and the solid electrolytic capacitor is used as a specimen 5 (comparison example).
2. Evaluation Method After the respective specimens (specimens 1 to 5) are placed in the inside of a thermostatic bath at a temperature of 25° C., an equivalent series resistance (ESR) is measured by applying a predetermined AC voltage (100 kHz) to the respective specimens. The measurement of an equivalent series resistance (ESR) is performed for every 500 hours for 4000 hours. As a result, when an ESR after 4000 hours have elapsed from the start of the measurement is 1.5 times as large as an initial value or less, evaluation "good" is given to the specimen, when an ESR after 4000 hours have elapsed from the start of the measurement is larger than a value 1.5 times as large as the initial value and is a value 5 times as large as the initial value or less, evaluation "fair" is given to the specimen, and when an ESR after 4000 hours have elapsed from the start of the measurement is larger than a value 5 times as large as the initial value, evaluation "bad" is given to the specimen.

3. Result of Evaluation

Figure 8:
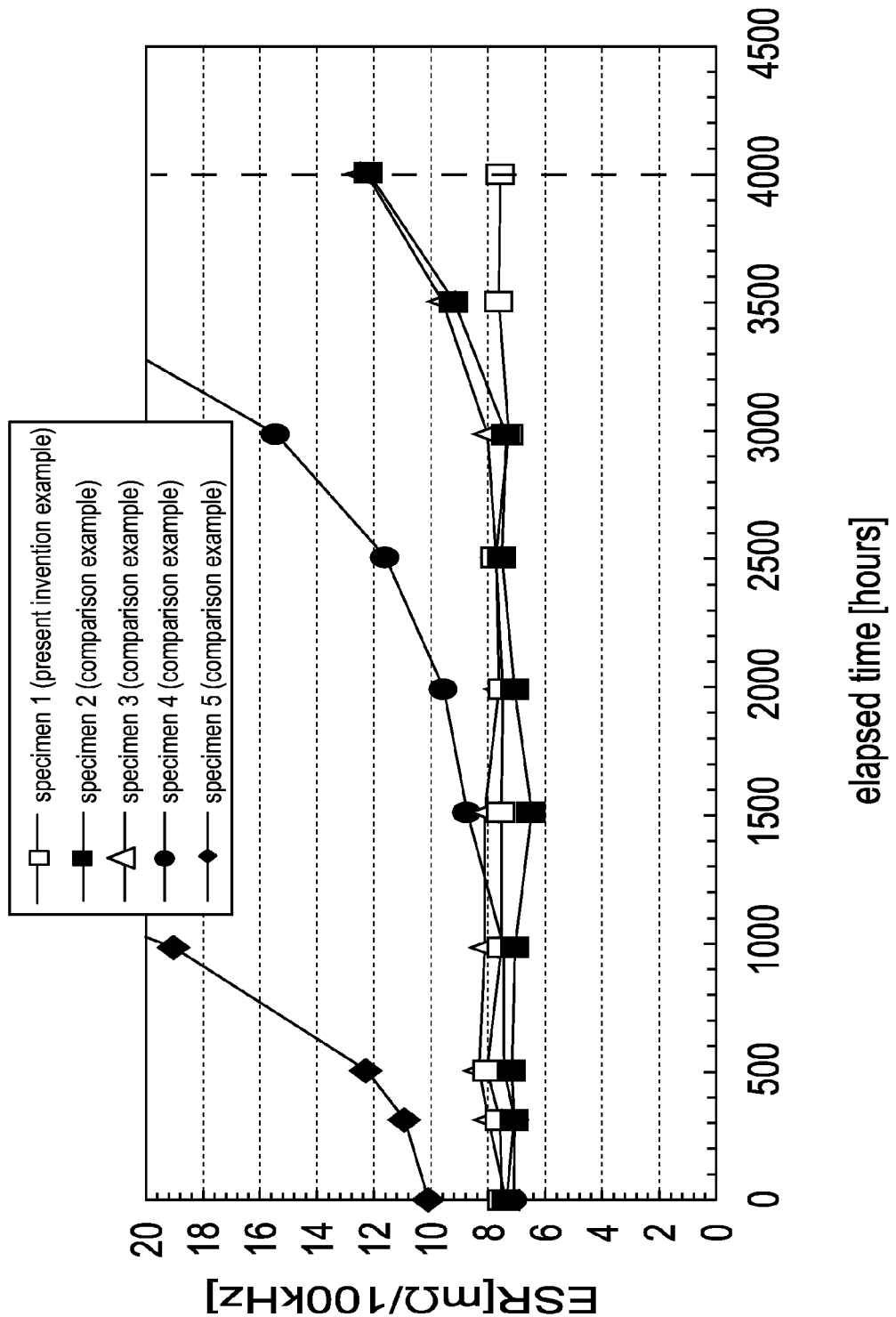
FIG. 8 is a graph showing the result of a test example 1.

FIG. 8 is a graph showing the result of the test example 1.

As can be understood also from the graph in FIG. 8, in the specimen 1 (present invention example), an ESR minimally changes from an initial value even when 4000 hours have elapsed from the start of the measurement, and the ESR after 4000 hours have elapsed from the start of the measurement is a value 1.5 times as large as an initial value or less and hence, the evaluation "good" is given to the specimen 1 (see FIG. 7A).

In both of the specimen 2 (comparison example) and the specimen 3 (comparison example), an ESR starts to increase after approximately 3000 hours have elapsed from the start of the measurement, and the ESR reaches approximately 12 mΩ after 4000 hours have elapsed from the start of the measurement. Accordingly, in both of the specimens 2, 3, the ESR after 4000 hours have elapsed from the start of the measurement is larger than a value 1.5 times as large as the initial value and is a value 5 times as large as the initial value or less and hence, the evaluation "fair" is given to the specimens 2, 3 (see FIG. 7A).

In the specimen 4 (comparison example), an ESR starts to increase after approximately 1500 hours have elapsed from the start of the measurement, an ESR reaches approximately 15 mΩ after 3000 hours have elapsed from the start of the measurement, and the ESR further continues to increase. Accordingly, in the specimens 4, it is considered that an ESR after 4000 hours have elapsed from the start of the measurement is larger than a value 5 times as large as the initial value, and the evaluation "bad" is given to the specimen 4 (see FIG. 7A).

In the specimen 5 (comparison example), an ESR starts to increase from the start of the measurement, an ESR reaches approximately 19 mΩ after 1000 hours have elapsed from the start of the measurement, and the ESR further continues to increase. Accordingly, in the specimens 4, it is considered that an ESR after 4000 hours have elapsed from the start of the measurement is larger than a value 5 times as large as the initial value, and the evaluation "bad" is given to the specimens 4 (see FIG. 7A).

Accordingly, it is ascertained that the solid electrolytic capacitor of the present invention (solid electrolytic capacitor of the specimen 1) is a solid electrolytic capacitor having an excellent long lifetime property from a viewpoint of an equivalent series resistance (ESR).

Test Example 2

The test example 2 is a test example for ascertaining that the solid electrolytic capacitor of the present invention is a solid electrolytic capacitor having more excellent long life-time property than the solid electrolytic capacitors of the respective comparison examples from a viewpoint of a change in weight.

1. Preparation of Specimens

A solid electrolytic capacitor having the same configuration as the solid electrolytic capacitor of the specimen 1 is prepared and the solid electrolytic capacitor is used as a specimen 6 (present invention example) solid electrolytic capacitors having the same configurations as the solid electrolytic capacitors of the specimens 2 to 5 are prepared and the solid electrolytic capacitors are used as specimens 7 to 10 (comparison examples).

2. Evaluation Method

Weights of the respective specimens (specimens 6 to 10) are measured when the respective specimens are left in the inside of a room after the specimens are placed in the inside of a thermostatic bath at a temperature of 25° C. The measurement of a weight is performed for every 500 hours for 4000 hours using an electronic force balance. As a result, when a change in weight from an initial value after 4000 hours have elapsed from the start of the measurement is 100 mg or less, and evaluation "good" is given to the specimen, and when a change in weight from an initial value after 4000 hours have elapsed from the start of the measurement is larger than 100 mg, and evaluation "bad" is given to the specimen.

3. Result of Evaluation

Figure 9:
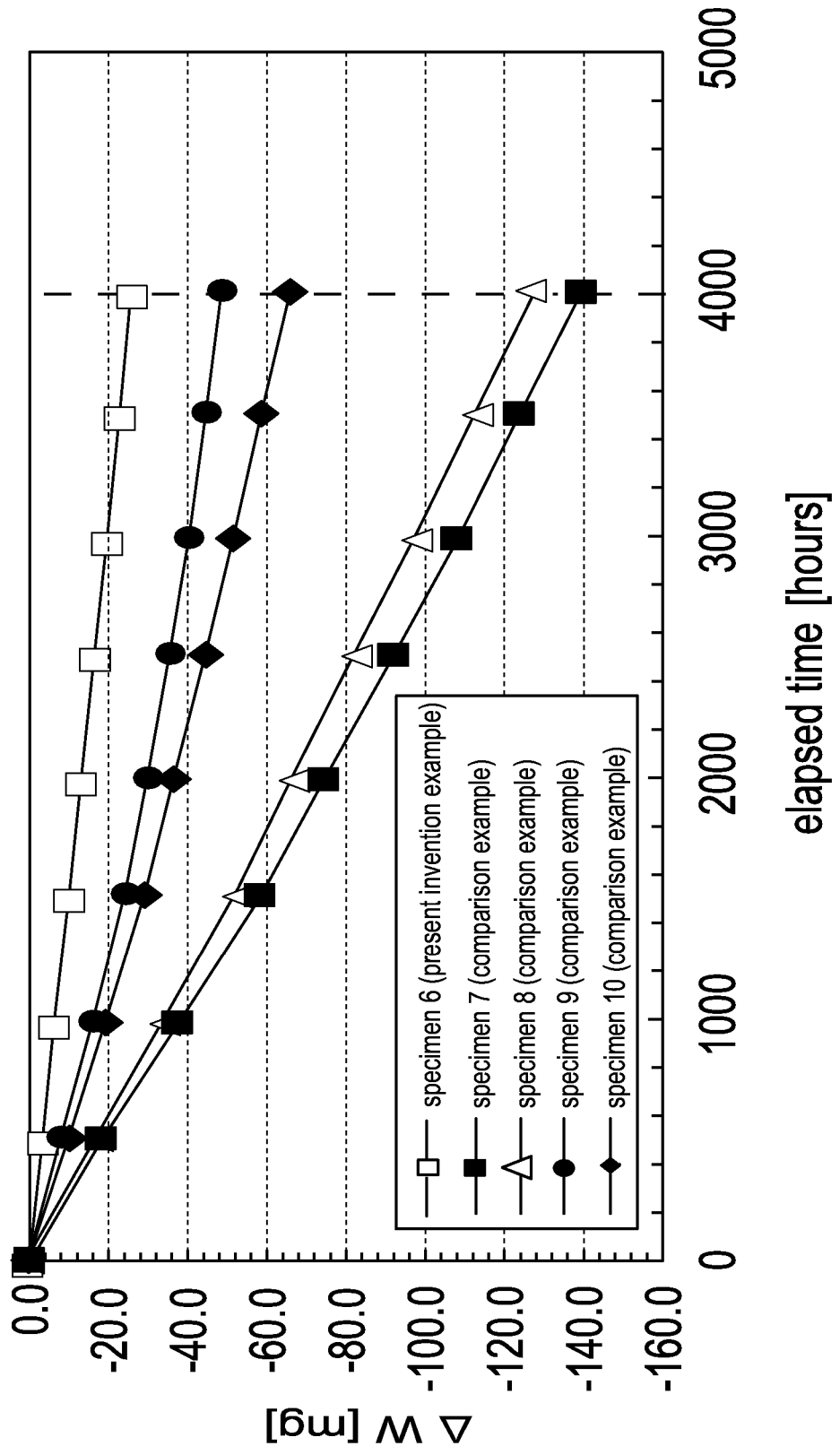
FIG. 9 is a graph showing the result of a test example 2.

FIG. 9 is a graph showing the result of the test example 2.

As can be understood also from the graph in FIG. 9, in the specimen 7 (comparison example), the above-mentioned change in weight is approximately 140 mg and, in the specimen 8 (comparison example), the above-mentioned change in weight is approximately 130 mg. Accordingly, in both of the specimens 7, 8, the changes in weight exceed 100 mg and hence, the evaluation "bad" is given to both of the specimens 7, 8 (see FIG. 7B).

On the other hand, in the specimen 6 (present invention example), the above-mentioned change in weight is approximately 25 mg, in the specimen 9 (comparison example), the change in weight is approximately 50 mg, and in the specimen 10 (comparison example), the change in weight is approximately 65 mg. Accordingly, the change in weight in all specimens 6, 9 and 10 is 100 mg or less and hence, the evaluation "good" is given to all of the specimens 6, 9 and 10 (see FIG. 7B). This means that a water-soluble high-molecular weight compound in a liquid form, an ethylene glycol and an electrolytic solution using an ethylene glycol as a solvent minimally pass through a sealing member and scatter to the outside.

Accordingly, it is ascertained that the solid electrolytic capacitors of the specimens 6, 7 and 10 are solid electrolytic capacitors having an excellent long lifetime property from a viewpoint of change in weight.

From the results of the test example 1 and the test example 2, it is ascertained that the solid electrolytic capacitor of the present invention is a solid electrolytic capacitor having an excellent long lifetime property from a viewpoint of an equivalent series resistance (ESR) and from a viewpoint of a change in weight.

Test Example 3

The test example 3 is a test example for ascertaining that the solid electrolytic capacitor of the present invention is a capacitor having an excellent low resistance property (equivalent series resistance (ESR) property) in the same manner as electrolyte capacitors.
1. Preparation of Specimens.

(1) Specimen 11 (Present Invention Example)

A solid electrolytic capacitor having the same configuration as the solid electrolytic capacitor of the specimen 1 is prepared and the solid electrolytic capacitor is used as a specimen 11 (present invention example).

(2) Specimen 12 (Comparison Example)

A capacitor (electrolyte capacitor) same as the solid electrolytic capacitor of the specimen 11 except for a point that a solid electrolyte is not introduced into a gap formed between an anode foil and a cathode foil and that an electrolytic solution is introduced into the gap in place of PEG300 is prepared and the solid electrolytic capacitor is used as a specimen 12 (comparison example).
2. Evaluation Method The respective specimens (specimens 11 and 12) are placed in the inside of a thermostatic bath at a temperature of 25° C., a predetermined AC voltage is applied to the respective specimens, and an equivalent series resistance (ESR) is measured while changing a frequency. When an ESR is 1Ω or less in a whole range of 0.1 kHz to 1000 kHz, evaluation "good" is given to the specimen, and when an ESR is larger than 1Ω at least in a part of the range of 0.1 kHz to 1000 kHz, evaluation "bad" is given to the specimen.
3. Result of Evaluation FIG. 10 is a graph showing the result of the test example 3.

Figure 10:
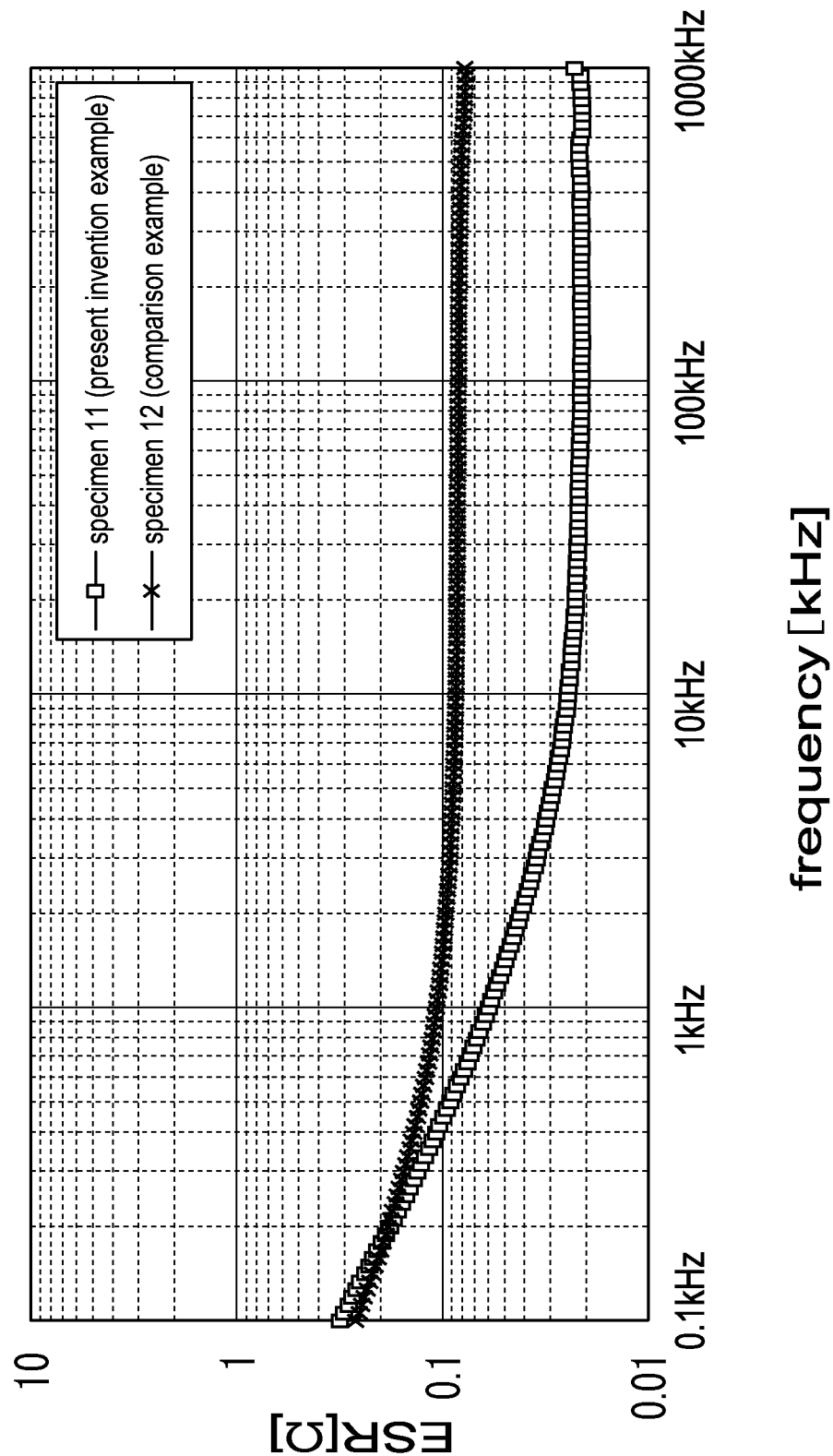
FIG. 10 is a graph showing the result of a test example 3.

As can be understood also from the graph in FIG. 10, in both of the specimen 11 (present invention example) and the specimen 12 (comparison example), the ESR is 1Ω or less in the whole range of 0.1 kHz to 1000 kHz and hence, the evaluation "good" is given to the specimen 11 (see FIG. 7C).

Accordingly, it is ascertained that the solid electrolytic capacitor of the specimen 11 (present invention example) is a capacitor having a low ESR in the same manner as the capacitor (electrolyte capacitor) of the specimen 12 (comparison example).

Accordingly, it is ascertained that the solid electrolytic capacitor of the present invention is a capacitor having an excellent low resistance property (equivalent series resistance (ESR) property) in the same manner as electrolyte capacitors. From the test example 3, it can be also ascertained that the solid electrolytic capacitor of the present invention is a capacitor having a further more excellent low resistance property (equivalent series resistance (ESR) property) than electrolyte capacitors in a frequency band of equal to or more than 0.3 KHz.

Test Example 4

The test example 4 is a test example for ascertaining that the solid electrolytic capacitor of the present invention is a solid electrolytic capacitor having a more excellent low temperature property than solid electrolytic capacitors of comparison examples.
1. Preparation of Specimens.

(1) Specimen 13 (Present Invention Example)

A solid electrolytic capacitor having a similar configuration to the solid electrolytic capacitor of the specimen 1 is prepared and the solid electrolytic capacitor is used as a specimen 13 (present invention example). A ratio of the area that the solid electrolyte occupies in a gap is set to 4 vol %. In order to set the ratio of the area that the solid electrolyte occupies in the gap to 4 vol %, a step that "a capacitor element is immersed in a solid electrolyte dispersion liquid and, then, the capacitor element is taken out and, thereafter, a heat treatment is applied to the capacitor element" is repeated twice.

(2) Specimen 14 (Present Invention Example)

A solid electrolytic capacitor having a similar configuration to the solid electrolytic capacitor of the specimen 1 is prepared and the solid electrolytic capacitor is used as a specimen 14 (present invention example). A ratio of the area that the solid electrolyte occupies in a gap is set to 2 vol %. In order to set the ratio of the area that the solid electrolyte occupies in the gap to 2 vol %, the above-mentioned step is performed once.

(3) Specimen 15 (Comparison Example)

A solid electrolytic capacitor (so-called hybrid capacitor) same as the solid electrolytic capacitor of the specimen 13 except for a point that an electrolytic solution is introduced into a gap formed between an anode foil and a cathode foil in place of introducing PEG300 is prepared and the solid electrolytic capacitor is used as a specimen 15 (comparison example).
2. Evaluation Method The respective specimens (specimens 13 to 15) are placed in the inside of a thermostatic bath, a predetermined AC voltage (10 kHz) is applied to the respective specimens, and an ESR is measured while changing a temperature. As a result, when an ESR is 0.3Ω or less in a whole temperature range of −60° C. to 0° C. (hereinafter, referred to as "evaluation standard"), evaluation "good" is given to the specimen, and when an ESR exceeds 0.3Ω at least in a part of the temperature range of −60° C. to 0° C., evaluation "bad" is given to the specimen.
3. Result of Evaluation FIG. 11 is a graph showing a result of the test example 4.

Figure 11:
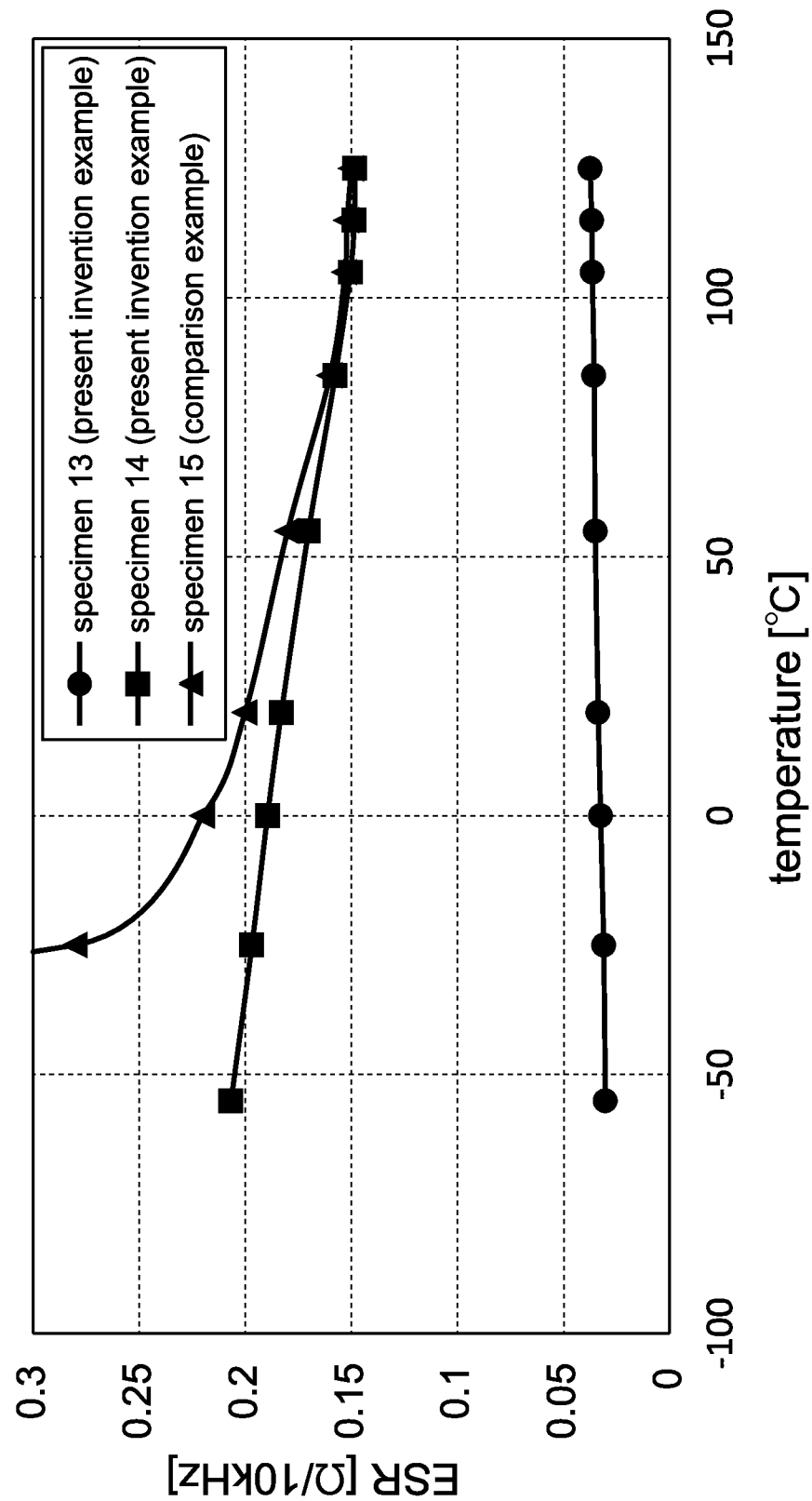
FIG. 11 is a graph showing the result of a test example 4.

As can be understood from the graph in FIG. 11, in the specimen 15 (comparison example), when a temperature is changed from 0° C. to a temperature lower than 0° C., the ESR suddenly increases, and the ESR reaches approximately 0.28Ω at a temperature of −25° C., and the ESR continues to increase. Accordingly, it is considered that the evaluation standard is not satisfied and hence, the evaluation "bad" is given to the specimen (FIG. 7D).

On the other hand, in the specimen 14 (present invention example), the ESR assumes a value which falls within a range of approximately 0.19Ω to 0.21Ω in the whole temperature range of −60° C. to 0° C., and in the specimen 14 (present invention example), the ESR is approximately 0.03Ω in the whole temperature range of −60° C. to 0° C. Accordingly, the both of the specimens 13, 14 satisfy the evaluation standard and hence, the evaluation "good" is given to the specimens 13, 14 (FIG. 7D).

In both of the specimen 14 (present invention example) and in the specimen 15 (comparison example), the ESR is 3 mΩ or less in a high temperature range and hence, both of the specimens 14, 15 exhibit favorable ESR. However, in a low temperature range, while the ESR of the specimen 15 (comparison example) suddenly increases, the ESR of the specimen 14 does not suddenly increase. Accordingly, it is safe to say that the specimen 14 (present invention example) exhibits more favorable low temperature resistance property than the specimen 15 (comparison example).

From the above-mentioned test result, it is ascertained that the solid electrolytic capacitor of the present invention is a solid electrolytic capacitor having a more excellent low temperature resistance property than the solid electrolytic capacitors of the comparison examples. That is, it is considered that, while in the specimen 15 (comparison example), since the electrolytic solution coagulates at a low temperature, a flow of the current which the electrolytic solution bears is prevented from flowing, in the specimen 13 and the specimen 14 (present invention examples), since the water-soluble high-molecular weight compound in a liquid form does not coagulate at a low temperature, a network between the solid electrolytes is minimally broken.

Test Example 5

The test example 5 is a test example for ascertaining that "the solid electrolytic capacitor (solid electrolytic capacitor where a water-soluble high-molecular weight compound in a liquid form is a mixed material made of two or more kinds of water-soluble high-molecular weight compounds having different molecular weights) is a solid electrolytic capacitor having an excellent low temperature resistance property and having an excellent long lifetime property from a viewpoint of a change in weight".

1. Preparation of Specimens
(1) Specimen 16 (PEG100+PEG600)

A solid electrolytic capacitor having the same configuration as the solid electrolytic capacitor of the embodiment 2 is prepared and the solid electrolytic capacitor is used as a specimen 16 (PEG100+PEG600).

(2) Specimen 17 (PEG100)

A solid electrolytic capacitor having the same configuration as the solid electrolytic capacitor of the specimen 1 except for that a PEG having a molecular weight of 100 is used as a water-soluble high-molecular weight compound in a liquid form is prepared and the solid electrolytic capacitor is used as a specimen 17 (PEG100).

(3) Specimen 18 (PEG600)

A solid electrolytic capacitor having the same configuration as the solid electrolytic capacitor of the specimen 1 except for that a PEG having a molecular weight of 600 is used as a water-soluble high-molecular weight compound in a liquid form is prepared and the solid electrolytic capacitor is used as a specimen 18 (PEG600).

(4) Specimen 19 (Solid Electrolytic Capacitor)

A solid electrolytic capacitor having the similar configuration to the solid electrolytic capacitor of the specimen 1 except for that, in place of introducing a solid electrolyte in a fine particle form into a gap formed between an anode foil and a cathode foil, a solid electrolyte made of a conductive high-molecule in a layered form formed by chemical oxidation polymerization is introduced into the gap formed between the anode foil and the cathode foil is prepared and the solid electrolytic capacitor is used as a specimen 19 (solid electrolytic capacitor).

2. Evaluation Method
(1) Evaluation Method 1

The respective specimens (specimens 16 to 19) are placed in the inside of a thermostatic bath, a predetermined AC voltage (100 kHz) is applied to the respective specimens, and an ESR is measured while changing a temperature. The measured ESRs are plotted in a graph where a temperature is taken on an axis of abscissas and an ESR is taken on an axis of ordinates, and a low temperature property is evaluated from a shape of an obtained curve and the ESR.

(2) Evaluation Method 2

The respective specimens (specimens 16 to 18) are placed in the inside of a thermostatic bath at a temperature of 25° C., and, thereafter, the specimens are left in the inside of a room. Then, a weight is measured after 200 hours, 500 hours and 730 hours. The measurement of the weight is performed using an electronic balance.

3. Result of Evaluation
(1) Result of Evaluation 1 (Result of Evaluation in Accordance with Evaluation Method 1)

Figure 12:
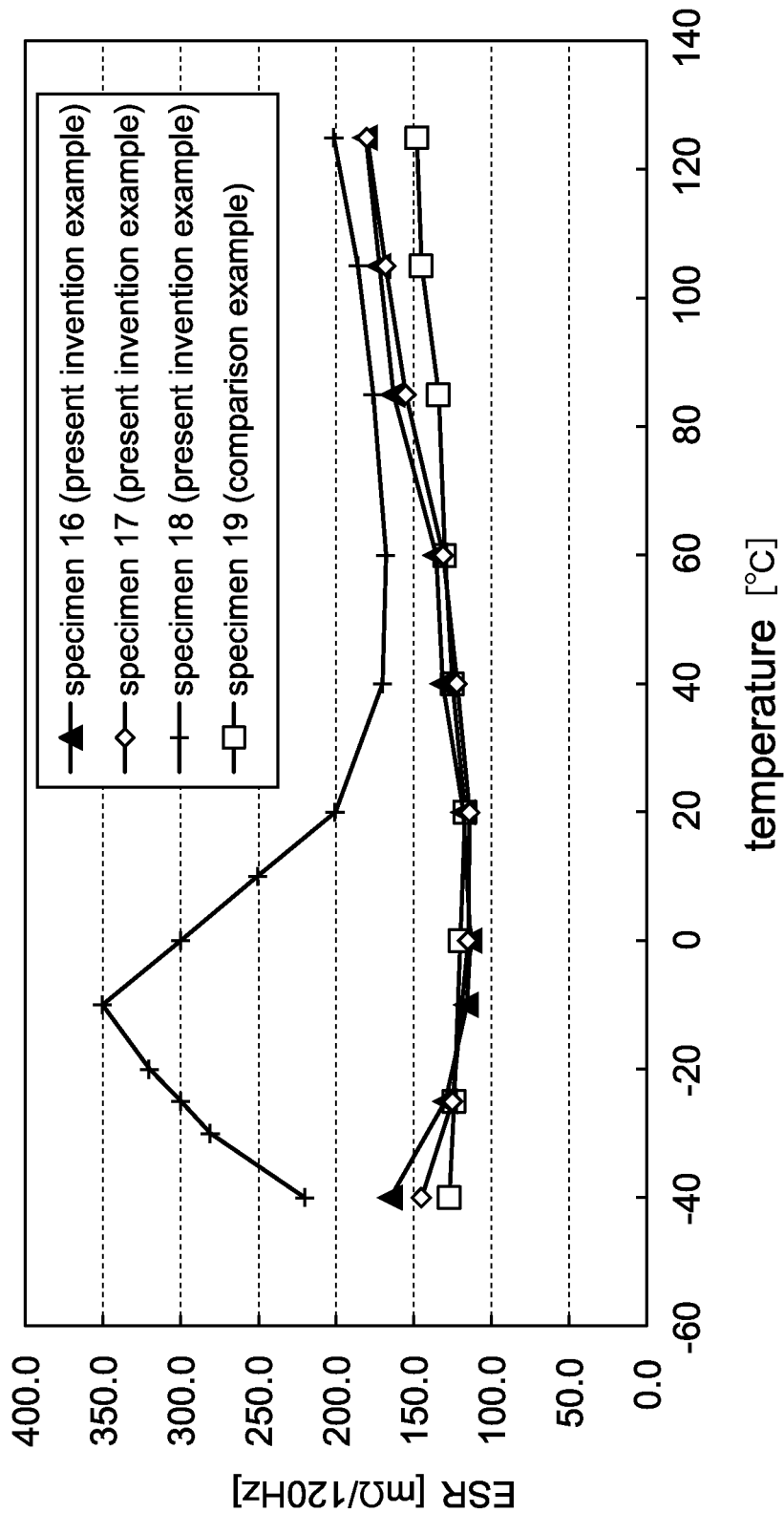
FIG. 12 is a graph showing the result of a test example 5 (evaluation method 1).

FIG. 12 is a graph showing a result of the test example 5 (evaluation method 1).

As can be understood from the graph in FIG. 12, in the specimen 16 (PEG100+PEG600), the ESR is gradually decreased until a temperature becomes 0° C., exhibits a minimum value of 110 mΩ at a temperature of 0° C. and, the ESR is gradually increased at a temperature below 0° C. and becomes 160 mΩ at a temperature of −40° C. In the specimen 17 (PEG100), the ESR is gradually decreased until a temperature becomes 0° C., exhibits a minimum value of 110 mΩ at a temperature of 0° C. and, the ESR is gradually increased below 0° C. and becomes 145 mΩ at a temperature of −40° C. In the specimen 18 (PEG600), the ESR is gradually decreased until a temperature becomes 40° C., is gradually increased at a temperature of 20° C. or below, exhibits a maximum value of 350 mΩ at a temperature of −10° C. and, thereafter, the ESR is gradually decreased at a temperature of −10° C. or below, and becomes 220 mΩ at a temperature of −40° C. Further, in the specimen 19 (solid electrolytic capacitor), the ESR is gradually decreased down to 20° C., exhibits a minimum value of 110 mΩ at a temperature of 0° C. and, thereafter, a change in ESR is minimally recognized at a temperature of 0° C. or below.

A high molecule having a large molecular weight is solidified at a low temperature and, at this point of time, a network of a solid electrolyte ruptures thus causing the increase of ESR in the solid electrolytic capacitor. Accordingly, as can be also understood from graph in FIG. 12, the specimen 18 (PEG 600) exhibits a larger ESR than the specimen 17 (PEG 100) or the specimen 19 (solid electrolytic capacitor generated by chemical oxidizing polymerization) at a low temperature. However, surprisingly, not only that the specimen 16 (PEG 100+PEG 600) exhibits substantially the same ESR as the specimen 17 (PEG 100) at a low temperature in spite of the fact that the specimen 16 uses a water-soluble high molecular weight compound containing high molecules (PEG 600) having a large molecular weight.

In view of the above, based on the result of evaluation 1 (result of evaluation made in accordance with evaluation method), it is ascertained that the solid electrolytic capacitors according to the specimens 16, 17 and 19 provide solid electrolytic capacitors having an excellent low temperature resistance property.

(2) Result of Evaluation 2 (Result of Evaluation in Accordance with Evaluation Method 2)

Figure 13:
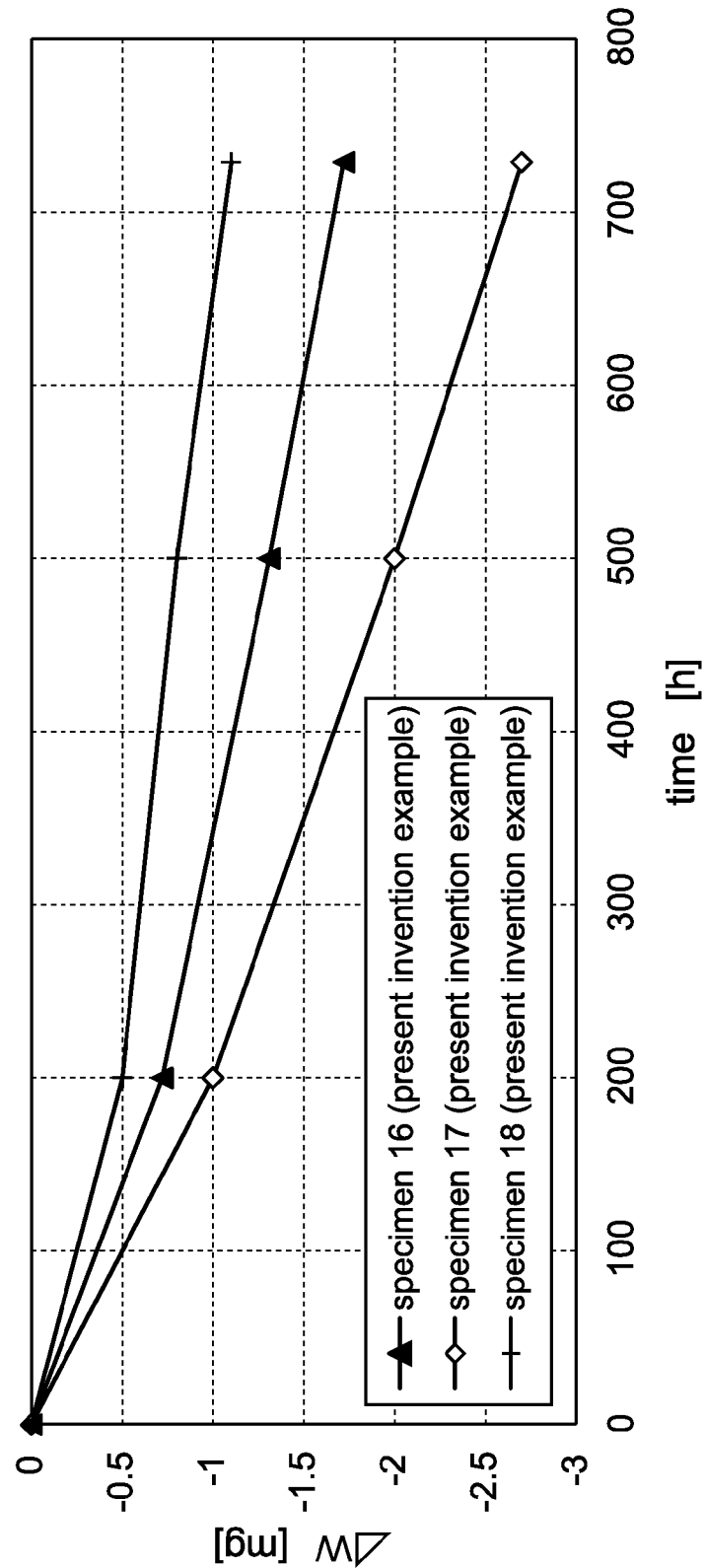
FIG. 13 is a graph showing the result of a test example 5 (evaluation method 2).

FIG. 13 is a graph showing a result of the test example 5 (evaluation method 2).

As can be understood from the graph in FIG. 13, a change in weight in the specimen 16 (PEG100+PEG600) is approximately −1.7 mg, a change in weight in the specimen 17 (PEG100) is approximately −2.7 mg, and a change in weight in the specimen 18 (PEG600) is approximately −1.1 mg. It is understood from this result that the solid electrolytic capacitor (specimen 16) formed by using a mixed material made of two or more kinds of water-soluble high-molecular weight compounds having different molecular weights is a solid electrolytic capacitor which can make a water-soluble high-molecular weight compound more difficult to pass through the sealing material and to scatter to the outside thus having a more excellent long lifetime property from a viewpoint of a change in weight than the solid electrolytic capacitor (PEG 100) formed by using a water-soluble high-molecular weight compound having a small molecular weight although not at a level of the solid electrolytic capacitor (PEG 600) formed by using a water-soluble high-molecular weight compound having a large molecular weight.

As described above, from the result of the specimen 5, it is ascertained that the solid electrolytic capacitor according to the specimen 16 (the solid electrolytic capacitor according to the embodiment 2 out of the solid electrolytic capacitors of the present invention (the solid electrolytic capacitor formed using a mixed material made of two or more kinds of water-soluble high-molecular weight compounds having different molecular weights)) is a solid electrolytic capacitor having an excellent low temperature resistance property and having an excellent long lifetime property from a viewpoint of a change in weight.

Although the solid electrolytic capacitor and the method of manufacturing the solid electrolytic capacitor according to the present invention have been described based on the above-mentioned embodiments, the present invention is not limited to the above-mentioned embodiments. The present invention can be carried out in various modes without departing from the gist of the present invention, and the following modifications are also conceivable.

(1) Although PEG is used as a water-soluble high-molecular weight compound in the above-mentioned respective embodiments, the present invention is not limited to PEG. Besides PEG, other water-soluble high-molecular weight compounds (water soluble silicone, branched polyether or the like, for example) may be also used.

(2) Although the same kinds (PEG) of water-soluble high-molecular weight compounds are used as two kinds of water-soluble high-molecular weight compounds having different molecular weights in the above-mentioned embodiment 2, the present invention is not limited to such water-soluble high-molecular weight compounds. Different kinds of water-soluble high-molecular weight compounds (for example, PEG and water-soluble silicone, PEG and branched polyether, water-soluble silicone and branched polyether or the like) may be also used.

(3) Although the water-soluble high-molecular weight compound is a mixed material made of two kinds of water-soluble high-molecular weight compounds having different molecular weights in the above-mentioned embodiment 2, the present invention is not limited to such a water-soluble high-molecular weight compound. The water-soluble high-molecular weight compound may be a mixed material made of three or more kinds of water-soluble high-molecular weight compounds having different molecular weights (for example, PEG, water-soluble silicone and branched polyether, PEG having a molecular weight of 100, PEG having a molecular weight of 600 and water-soluble silicone or the like).

(4) In the above-mentioned respective embodiments, although a solid electrolyte is introduced into a gap formed between the anode foil and the cathode foil by an immersion impregnation method in the second step, the present invention is not limited to such an electrolyte filling method. A solid electrolyte may be filled into a gap formed between the anode foil and the cathode foil using a vacuum impregnation method.

(5) In the above-mentioned respective embodiments, although a water-soluble high-molecular weight compound in a liquid form is introduced into a gap formed between the anode foil and the cathode foil by filling by an immersion impregnation method, the present invention is not limited to such an immersion impregnation method. A water-soluble high-molecular weight compound in a liquid form may be introduced into the gap formed between the anode foil and the cathode foil using a vacuum impregnation method.

(6) Although a solid electrolyte which does not contain a water-soluble high-molecular weight compound is used as the solid electrolyte in the above-mentioned respective embodiments, the present invention is not limited to such a solid electrolyte. A solid electrolyte which contains a water-soluble high-molecular weight compound may be used as the solid electrolyte.

(7) Although the evaluation of the solid electrolytic capacitors according to the present invention are performed using the solid electrolytic capacitors which are formed using PEG having a molecular weight of 300 (PEG 300) in the above-mentioned test examples 1 to 4, the present invention is not limited to such solid electrolytic capacitors. The substantially same evaluation result can be acquired by using solid electrolytic capacitors which are formed using PEG having a molecular weight of 100 to 600 (PEG 100 to PEG 600).

(8) Although the solid electrolytic capacitor according to the present invention has been explained using a wound-type solid electrolytic capacitor in the above-mentioned respective embodiments, the present invention is not limited to such a solid electrolytic capacitor. The present invention is also applicable to other solid electrolytic capacitors including a lamination-type solid electrolytic capacitor.

What is claimed is:

1. A solid electrolytic capacitor comprising:
an anode foil having a surface on which an oxide film is formed;
a cathode foil; and
a separator disposed between the anode foil and the cathode foil, wherein
a solid electrolyte in a fine particle form made of a conductive high molecular weight compound and a water-soluble high-molecular weight compound in a liquid form are introduced into a gap formed between the anode foil and the cathode foil in a state where the water-soluble high-molecular weight compound in a liquid form surrounds the solid electrolyte, and a ratio of an area that the solid electrolyte occupies in the gap is set to a value which falls within a range of 1 vol % to 30 vol %, and a ratio of an area that the water-soluble high-molecular weight compound in a liquid form occupies in the gap is set to a value which falls within a range of 10 vol % to 99 vol %,
wherein the water-soluble high-molecular weight compound in a liquid form is a mixed material made of two or more kinds of polyethylene glycols having different molecular weights.

2. The solid electrolytic capacitor according to claim 1, wherein an average particle size of the solid electrolyte in a fine particle form is set to a value which falls within a range of 1 nm to 300 nm.

3. The solid electrolytic capacitor according to claim 1, wherein the water-soluble high-molecular weight compound in a liquid form has an oxide film repairing property.

4. The solid electrolytic capacitor according to claim 1, wherein out of the two or more kinds of polyethylene glycols having different molecular weights, a molecular weight of the polyethylene glycol having the largest molecular weight is 1.2 or more times as large as a molecular weight of the polyethylene glycol having the smallest molecular weight.

5. The solid electrolytic capacitor according to claim 1, wherein the ratio of the polyethylene glycol having the largest molecular weight out of the two or more kinds of polyethylene glycols having different molecular weights with respect to the water-soluble high-molecular weight compound in a liquid form is set to a value which falls within a range of 20 vol % to 80 vol %.

6. The solid electrolytic capacitor according to claim 1, wherein a molecular weight of the polyethylene glycols is set to a value which falls within a range of 100 to 1000.

7. A method of manufacturing a solid electrolytic capacitor comprising:
a first step of preparing a capacitor element which includes an anode foil having a surface on which an oxide film is formed, a cathode foil, and a separator arranged between the anode foil and the cathode foil;
a second step of introducing a solid electrolyte in a fine particle form made of a conductive high-molecular weight compound into a gap formed between the anode foil and the cathode foil such that a ratio of an area that the solid electrolyte occupies in the gap is set to a value which falls within a range of 1 vol % to 30 vol %; and
a third step of introducing a water-soluble high-molecular weight compound in a liquid form in the gap formed between the anode foil and the cathode foil such that the water-soluble high-molecular weight compound surrounds the solid electrolyte and a ratio of an area that the water-soluble high-molecular weight compound in a liquid form occupies in the gap is set to a value which falls within a range of 10 vol % to 99 vol % in this order,
wherein the water-soluble high-molecular weight compound in a liquid form is a mixed material made of two or more kinds of polyethylene glycols having different molecular weights.

8. The method of manufacturing a solid electrolytic capacitor according to claim 7, wherein an average particle size of solid electrolyte in a fine particle form is set to a value which falls within a range of 1 nm to 300 nm.

9. The method of manufacturing a solid electrolytic capacitor according to claim 7, wherein, in the second step, a solid electrolyte dispersion liquid in which the solid electrolyte is dispersed in a solvent is filled in the gap using a vacuum impregnation method or an immersion impregnation method and, thereafter, the solvent is removed from the gap thus introducing the solid electrolyte into the gap.

10. The method of manufacturing a solid electrolytic capacitor according to claim 7, wherein, in the third step, the water-soluble high-molecular weight compound in a liquid form is introduced into the gap by filling the water-soluble high-molecular weight compound in a liquid form into the gap using a vacuum impregnation method or an immersion impregnation method.

* * * * *